United States Patent [19]

Owa

[11] Patent Number: 5,838,709
[45] Date of Patent: Nov. 17, 1998

[54] ULTRAVIOLET LASER SOURCE

[75] Inventor: Soichi Owa, Tokyo, Japan

[73] Assignee: Nikon Corporation, Tokyo, Japan

[21] Appl. No.: 657,910

[22] Filed: Jun. 7, 1996

[30] Foreign Application Priority Data

| Jun. 7, 1995 | [JP] | Japan | 7-140805 |
| Nov. 29, 1995 | [JP] | Japan | 7-310763 |
| Feb. 29, 1996 | [JP] | Japan | 8-043019 |
| Mar. 13, 1996 | [JP] | Japan | 8-056593 |

[51] Int. Cl.$^6$ .................................................. H01S 3/14
[52] U.S. Cl. ............................ 372/68; 372/21; 372/22; 372/23; 372/25; 372/69; 372/70; 372/109; 372/26
[58] Field of Search ................................ 372/9, 21, 22, 372/23, 25, 26, 30, 43, 50, 68, 69, 70, 109

[56] References Cited

U.S. PATENT DOCUMENTS

| 4,439,861 | 3/1984 | Bradford | 372/25 |
| 5,027,361 | 6/1991 | Kozlovsky et al. | 372/22 |
| 5,091,744 | 2/1992 | Omata | 355/53 |
| 5,321,718 | 6/1994 | Waarts et al. | 372/108 |
| 5,384,797 | 1/1995 | Welch et al. | 372/23 |
| 5,402,437 | 3/1995 | Mooradian | 372/92 |
| 5,412,675 | 5/1995 | Odagawa | 372/29 |
| 5,451,977 | 9/1995 | Kusuda et al. | 345/44 |
| 5,473,409 | 12/1995 | Takeda et al. | 355/53 |
| 5,510,892 | 4/1996 | Mizutani et al. | 356/139.1 |
| 5,581,395 | 12/1996 | Tonosaki et al. | 359/326 |

FOREIGN PATENT DOCUMENTS

| 63-173324 | 7/1988 | Japan | 372/22 X |
| 3-183117 | 8/1991 | Japan | 372/22 X |
| 5-3141 | 1/1993 | Japan | 372/43 X |
| 7-142805 | 6/1995 | Japan | 372/21 X |

OTHER PUBLICATIONS

Ushida, "Excimer Laser Stepper", *Optics*, vol. 23(10):602–608, (Oct. 1994).

Latta et al., "Generation of 41 mW Of Blue Radiation By Frequency Doubling Of A GaAlAs Diode Laser", *Appl. Phys. Lett.*, vol. 56(23):2291–2292, (1990).

Koechner, "Solid–State Laser Engineering", 3rd Edition, *Springer Series In Optical Sciences*, vol. 1:225–238 and 246–249, (1994).

Liu et al., "Longitudinally Diode–Pumped Continuous–Wave 3.5–W Green Laser", *Optics Letters*, vol. 19(3):189–191, (1994).

*Primary Examiner*—Brian Healy
*Attorney, Agent, or Firm*—Foley & Lardner

[57] ABSTRACT

An ultraviolet laser source which can stably emits ultraviolet light having a sufficient output and low coherence, as a light source for an exposure unit, for a long period of time, is compact, and allows easy maintenance. The laser source is constituted by 10×10 laser elements, i.e., a total of 100 laser elements. Each laser element includes a laser beam emitting section for emitting light having a long wavelength, i.e., visible or infrared light, and a wavelength converting section for converting the emitted laser beam into ultraviolet light. The laser beam emitting section includes a semiconductor laser, and a solid-state laser. The wavelength converting section contains a nonlinear crystal for converting the wavelength of incident light and outputting the resultant light.

54 Claims, 17 Drawing Sheets

21  22       23

811  812  813  814

ULTRAVIOLET LASER SOURCE

BACKGROUND OF THE INVENTION

1. Field of the Invention

The present invention relates to a light source for an exposure unit (apparatus) used in a semiconductor manufacturing process and, more particularly, to an ultraviolet laser source capable of emitting an ultraviolet laser beam.

2. Related Background Art

With advances in information equipment, demand has arisen for semiconductor integrated circuits having higher performance and larger storage capacities. In order to meet this demand, the integration degree of a semiconductor integrated circuit must be increased. The size of each circuit pattern may be decreased to increase the integration degree. The minimum pattern size is determined by the performance of an exposure unit used in the manufacturing process.

The exposure unit optically projects and transfers a circuit pattern formed on a mask onto a semiconductor wafer. In this case, a minimum pattern size R on the wafer is written, using a wavelength $\lambda$ of light used for projection in the exposure unit, and a numerical aperture NA of a projection lens, by the following equation:

$$R = K \cdot \lambda / NA \quad (1)$$

where K is a constant determined by an illumination optical system or process, which is generally set to about 0.5 to 0.8.

SUMMARY OF THE INVENTION

It is an object of the present invention to provide an ultraviolet laser source that can stably emit ultraviolet light having a sufficient output and low coherence, as a light source for an exposure unit, for a long period of time, is compact, and allows easy maintenance.

In order to achieve the above object, there is provided an ultraviolet laser source comprising a bundle of a plurality of laser elements arranged parallel to each other, each of the laser elements including a laser beam emitting section for emitting light in a wavelength range including infrared to visible regions, and a wavelength converting optical section for wavelength-converting the emitted light into ultraviolet light by using nonlinear optical crystals.

More specifically, the laser beam emitting section of each laser element includes, e.g., a semiconductor laser and a solid-state laser pumped by light emitted from the semiconductor laser.

According to the present invention, in each laser element, infrared or visible light emitted from the laser beam emitting section including, e.g., a semiconductor laser, is wavelength-converted by the nonlinear optical crystals in the wavelength converting optical system to generate ultraviolet light.

By bundling a plurality of laser elements each having the above structure, light outputs add up to finally obtain a high output from the overall light source. In addition, since light beams are output from the independent laser elements, the temporal and spatial coherences can be decreased.

In addition, since a plurality of laser elements are bundled together to obtain a desired light output, an output from each laser element can be lower than the desired light output. For this reason, the load on the nonlinear optical crystal of each wavelength converting section can be reduced, and a deterioration in each nonlinear optical crystal can be minimized, thereby allowing a long-term, stable operation and prolonging the service life of the apparatus.

In order to achieve the above object, there is also provided a laser source comprising a laser beam generating emitting section constituted by parallel laser elements for emitting pulse-like laser beams, and a timing adjusting section for controlling emission timings of the plurality of laser elements, wherein the timing adjusting section controls the emission timings such that a plurality of laser pulse beams are not output simultaneously.

In addition, in order to achieve the above object, there is provided a laser source comprising a plurality of laser elements arranged parallel to each other, each of the laser elements emitting a laser beam, and an optical member having portions respectively inserted in optical paths of the plurality of laser elements and serving as optical elements for transmitting only light components passing the optical paths and having wavelengths within a specific wavelength range, the portions being integrally supported.

The optical member is a single etalon inserted in the optical paths of the laser elements at positions corresponding to each other to have the same inclination corresponding to a desired wavelength of transmitted light with respect to all the optical paths.

More specifically, according to the present invention, there is provided a laser source comprising a plurality of laser elements arranged parallel to each other, each of the laser elements including a laser beam emitting section having a laser resonator and adapted to emit a laser beam in a wavelength range including infrared to visible regions, and a wavelength converting optical system for wavelength-converting the emitted laser beam into ultraviolet light by using nonlinear optical crystals, and a single etalon inserted in optical paths of the laser resonators of all the laser elements. Each of the plurality of laser elements emits at least a laser beam having a wavelength included in a transmission wavelength range based on the inserted etalon.

Furthermore, according to the present invention, there is provided a laser source comprising a plurality of laser elements arranged parallel to each other, each of the laser elements including a pulse laser beam emitting section having a laser resonator and adapted to emit a pulse laser beam in a wavelength range including infrared to visible regions, and a wavelength converting optical system for wavelength-converting the emitted pulse laser beam into ultraviolet light by using nonlinear optical crystals, and a single etalon inserted in optical paths located outside exit ports of the laser resonators of all the laser elements, and wavelength control means for controlling a wavelength of a laser beam emerging from the laser resonator by controlling a length of the laser resonator in accordance with an intensity of the laser beam transmitted through the etalon.

According to another aspect of the present invention, there is provided a laser source comprising a plurality of laser elements arranged parallel to each other, each of the laser elements including a laser beam emitting section for emitting a fundamental wave as light in a predetermined wavelength region, and nonlinear optical crystals for outputting light having a desired wavelength from the fundamental wave. An optical element is disposed on an exit end of the laser element to cause light from the laser element to diverge.

As described above, a laser source capable of outputting desired power can be obtained by bundling a plurality of laser elements in rows, even though the output power of each laser element is lower than the desired power. In addition, since light beams are emitted from different laser elements, a light source with low coherence can be obtained.

Furthermore, since the light emitted from each laser element is caused to diverge by an optical element, an illumination surface can be illuminated with the light almost uniformly.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 shows the overall structure of an ultraviolet laser source of this embodiment, and FIG. 3 shows the structure of each laser element.

DESCRIPTION OF THE PREFERRED EMBODIMENTS

Figure 1:
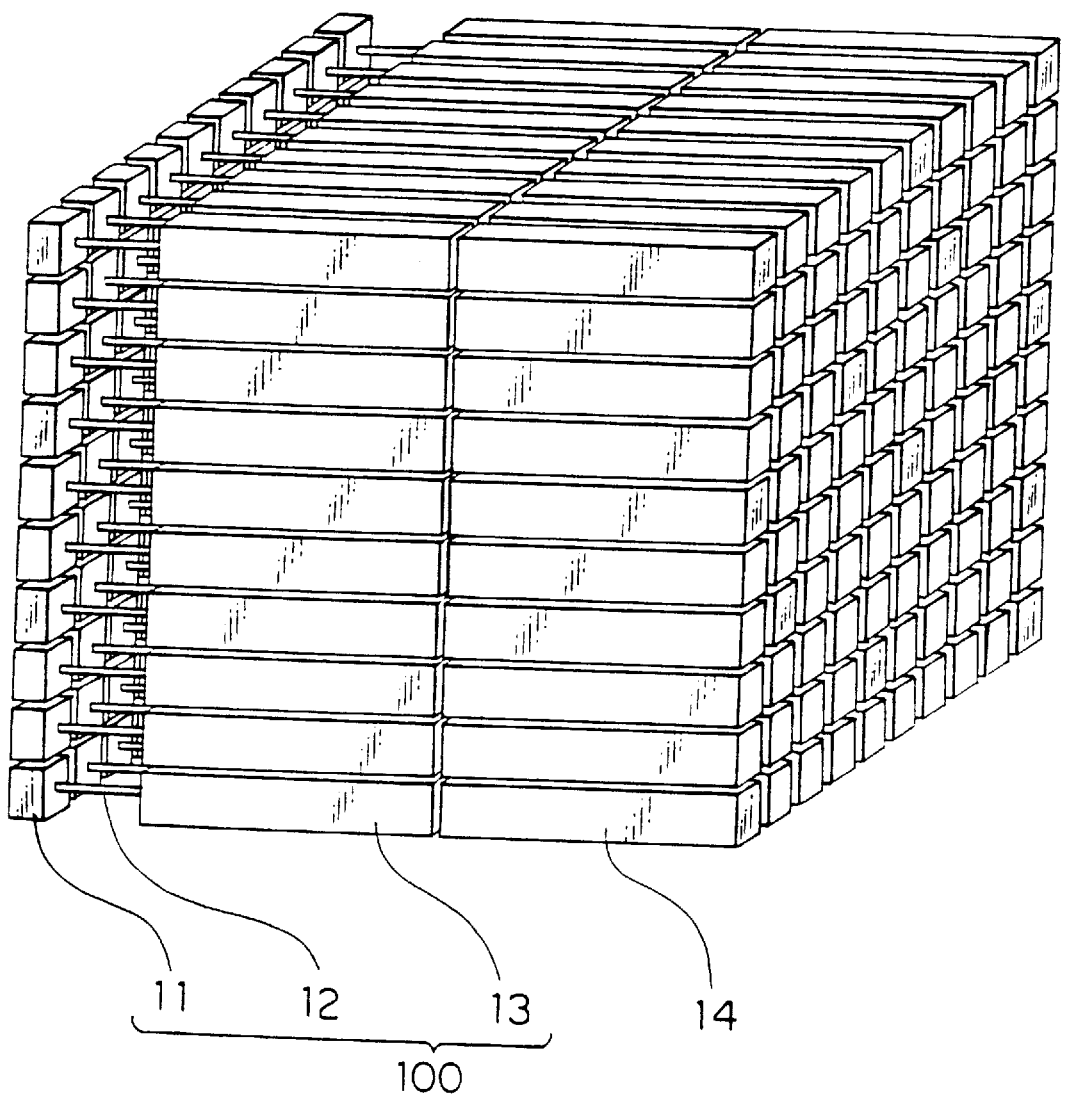
FIG. 1 is a drawing showing an ultraviolet laser source according to a first embodiment of the present invention.

Efforts to decrease the minimum pattern size R in equation (1) described above so as to improve the resolution have been toward decreasing the constant K, increasing the numerical aperture NA, and decreasing the wavelength $\lambda$ of exposure light.

The method of decreasing the constant K is called super-resolution in a broad sense. Improvements in illumination optical systems, modified illumination, phase shift mask methods have been proposed. However, patterns to which this method can be applied are limited. With an increase in the numerical aperture NA, the minimum pattern size R can be decreased. At the same time, however, the depth of focus decreases. For this reason, there is a limit to how much the numerical aperture can be increased. In general, about 0.5 to 0.6 are considered to be proper numerical apertures.

The simplest and most effective method of decreasing the minimum pattern size R is the method of decreasing the wavelength $\lambda$ of light used for exposure, and providing a light source for an exposure unit, which emits light having a short wavelength. The present invention has been made to meet this demand.

In forming a light source for an exposure unit, there are several conditions to be satisfied, as well as attaining a decrease in wavelength. These conditions will be described below.

First, a light output of several watts is required to restrict the time required for exposure/transfer of an integrated circuit pattern to a short period of time.

Second, in the case of ultraviolet light having a wavelength of 300 nm or less, the line width of the emission spectrum needs to be 1 pm or less since only limited materials can be used for a lens of the exposure unit and chromatic aberration correction is difficult to perform.

Third, the spatial coherence of light emitted from the light source must be decreased for the following reason. With a decrease in line width, the temporal coherence increases. If, therefore, light having a narrow line width is directly irradiated, an unnecessary interference pattern called speckles is produced. In order to eliminate such a pattern, the third condition is required.

Fourth, a mask must be uniformly illuminated. In a conventional technique, light emitted from a light source is split/focused by a fly-eye lens disposed in an illumination optical system to form a plurality of point light sources. Light diverging from the respective point light sources and emerging from the respective lens elements of the fly-eye lens are superimposed on each other on an illumination surface. With this operation, the illumination surface can be illuminated with a uniform light intensity.

Typical conventional exposure unit light sources will be described next, together with problems posed when the respective light sources are to satisfy the following conditions and emit ultraviolet light.

(1) Mercury lamp

Of the emission lines of a mercury lamp, the g-line (wavelength: 436 nm) and i-line (wavelength: 365 nm) have been used. With the use of these emission lines, the minimum pattern sizes (to be referred to as the minimum sizes hereinafter) are about 500 nm and about 350 nm, respectively. Each of these spectral line widths is broader than that of a laser beam, and hence has low temporal coherence. Even with such broad line widths, since these wavelengths allow correction of the chromatic aberration of a lens, no problems have been posed. In addition, the spatial coherence of light from the mercury lamp is lower than a laser beam. Owing to these two low coherences, no problem is posed in terms of speckles.

However, the mercury emission lines described above have long wavelengths, and hence it has become difficult for a mercury lamp to meet the requirement for the new minimum size. In some method, an ultraviolet emission line having a shorter wavelength of the mercury emission lines is used. However, this emission line has a broad spectral line width, and an achromatic lens cannot be used outside the ultraviolet region. For this reason, it is difficult to use the ultraviolet emission line in the ultraviolet region.

(2) KrF excimer laser

A KrF excimer laser emits light having a wavelength of 248 nm. The minimum size is therefore about 250 nm. With this wavelength, it is difficult to manufacture an achromatic lens. For this reason, the spectral line width of a light source laser must be set in a narrow band of 1 pm or less.

With this decrease in band, however, the temporal coherence increases, posing a problem in terms of speckles or speckle pattern. For this reason, according to, e.g., Kazuo USHIDA, "Excimer Laser Stepper", Optics, Vol. 23, No. 10, (October 1994), p. 602, in order to suppress the generation of speckles, an optical system for decreasing the spatial coherence is added.

KrF excimer lasers for exposure units have already been developed and used. However, an excimer laser is more expensive and larger than a mercury lamp, and uses poisonous fluorine gas. In addition, the excimer laser demands maintenance, e.g., replacement of the optical system and fluorine gas. This maintenance cost is high.

Furthermore, light emitted from this laser is pulse light, and hence has a larger peak power than continuous light. For this reason, the laser and the optical parts in the exposure unit are susceptible to optical damages.

(3) ArF excimer laser

An ArF excimer laser emits light having a wavelength of 193 nm. In this case, the practical minimum size is about 190 nm. An ArF excimer laser for an exposure unit is being developed. This laser, however, has the same problems as those in the KrF excimer laser. That is, the ArF excimer laser is expensive and large in size, uses noxious fluorine gas, and demands maintenance, e.g., replacement of the optical system and fluorine gas. The maintenance cost is high again.

In addition, it is more difficult for the ArF excimer laser to decrease the oscillation linewidth to reduce the chromatic aberration of the exposure unit than for the KrF excimer laser.

Furthermore, an ArF excimer laser beam is pulse light having higher energy and a shorter wavelength than a KrF excimer laser beam. For this reason, optical damages to the ArF excimer laser and the optical parts in the exposure unit are worse than those to the KrF excimer laser.

(4) Light source based on generation of harmonics from semiconductor-laser-pumped solid-state laser As a method of generating ultraviolet light, a method of converting light having a long wavelength (visible light or infrared light) into ultraviolet light by using a second-order nonlinear optical effect is available. For example, as disclosed in L. Y. Liu, M. Oka, W. Wiechmann and S. Kubota, "Longitudinally diode-pumped continuous-wave 3.5-W green laser", Optics Letters, Vol. 19, (1994), p. 189, a laser source for performing wavelength conversion of light from a semiconductor-laser-pumped solid-state laser has been developed. This reference discloses a scheme of performing wavelength conversion of 1,064-nm light emitted from a YAG laser by using a nonlinear crystal to generate fourth harmonic 266-nm light as a fourth harmonic.

Such a conventional semiconductor-laser-pumped solid-state laser source has the following merits: it is compact; allows easier maintenance than an excimer laser; has a high power-efficiency; and allows easy control of the light output. In addition, this laser source can emit continuous light as well as pulse light. Furthermore, the laser source allows a decrease in oscillation line width in the stage of a long wavelength before wavelength conversion. This makes line width control easier than in an excimer laser in which ultraviolet light must be directly controlled.

In spite of these merits, this technique has not been applied to an exposure unit, and such lasers are being developed in only laboratories. One of the reasons why this laser has not been used as a light source for an exposure unit is that an increase in output power will damage the nonlinear crystal and shorten the service life of the apparatus.

In addition, the spatial coherence becomes higher than in an excimer laser, and speckles are generated because of the reason described below.

The relationship between the generation of speckles and coherence will be described in more detail next.

An unnecessary interference pattern such as speckles can be removed by decreasing the temporal or spatial coherence of light. To decrease the temporal coherence is to mix light components having different frequencies. To decrease the spatial coherence is to mix light components which are generated in different places and propagate in different directions.

Ultraviolet light used in an exposure light needs to have an oscillation line width of 1 pm or less. Such a decrease in line width will increase the temporal coherence. In addition, light emitted from a laser consists of a finite number of transverse modes. The smaller the number of transverse modes, the higher the spatial coherence is.

In a conventional exposure unit using a KrF excimer laser, a vibrating reflecting mirror is used to split a laser beam into a plurality of light components to decrease the spatial coherence. The excimer lasers have been designed to oscillate in several hundred transverse modes and have relatively low spatial coherence. No problems have therefore been posed in the above method.

In contrast to this, when wavelength conversion for a solid-state laser is to be performed by using a nonlinear crystal, since a beam must be focused strongly in the nonlinear crystal, the laser generally oscillates in one transverse mode. This means that the spatial coherence is maximized. In such a case, it is difficult to decrease the spatial coherence.

The present invention has been made in consideration of the problems posed in the conventional techniques, e.g., the problems posed when, for example, an excimer laser is used as an ultraviolet light source for an exposure unit, i.e., an increase in apparatus size, use of toxic fluorine gas, and difficult and expensive maintenance, and the problems expected when a semiconductor-laser-pumped solid-state laser is used as an ultraviolet light source for an exposure unit, i.e., damages to the nonlinear optical crystal for wavelength conversion and generation of speckles with an increase in spatial coherence.

First Embodiment

An ultraviolet laser source according to the first embodiment of the present invention will be described below with reference to FIG. 1.

As shown in FIG. 1, the ultraviolet laser source of this embodiment is constituted by 10×10 laser elements, i.e., a total of 100 laser elements. Each laser element includes a laser beam emitting section 100 for emitting visible or infrared light as light having a long wavelength, and a wavelength converting section 14 for converting the emitted laser beam into ultraviolet light. In this embodiment, as the laser beam emitting section 100, a semiconductor-laser-pumped solid-state laser is used.

The laser beam emitting section 100 has a semiconductor laser 11, an optical fiber 12, and a solid-state laser 13. The wavelength converting section 14 contains a nonlinear crystal for wavelength conversion. Although each laser element also includes a reflecting mirror, a lens, a wave plate, a polarizer, and the like as optical elements, the detailed structure of each element will be described in the following embodiments, but will be omitted here.

Each of the laser elements, excluding the semiconductor laser 11, has a cross-sectional area of 5 mm×5 mm. In this embodiment, the light source is constituted by a combination of 100 laser elements. However, the number of laser elements is not limited to this. The present invention has been made on the premise that 2 to about 1,000 laser elements are used.

The semiconductor laser 11 is used to pump the solid-state laser 13. The solid-state laser 13 pumped by light from the semiconductor laser 11 oscillates visible or near infrared light. In this embodiment, this light is converted into ultraviolet light having a short wavelength by the nonlinear crystals of the wavelength converting section 14.

In some scheme (intra-cavity method), the nonlinear crystal for wavelength conversion is inserted into the resonator structure of the solid-state laser to integrate the solid-state laser 13 and the wavelength converting section 14 into one unit. An ultraviolet laser source using this structure will be described in detail in the following embodiments.

According to this embodiment, a plurality of laser elements each having the above structure are bundled to add light outputs together so as to realize a high output. In addition, since light beams are output from the independent laser elements, the temporal and spatial coherences can be decreased.

Furthermore, since a plurality of laser elements are bundled, an output from each laser element need not be increased. For this reason, by reducing the load on the nonlinear crystal in the wavelength converting section 14, a deterioration in the crystal can be minimized. The service life of the apparatus can therefore be prolonged.

The line width of the wavelength of light emitted from each laser element in this embodiment can be decreased to a value sufficiently smaller than 1 pm. In addition, the differences in wavelength between the laser elements can be set to 1 pm or less by adjusting the structures of solid-state laser media, laser resonator lengths, and wavelength selection optical systems.

The semiconductor laser 11 will be described in detail next.

A semiconductor laser emits light by causing transition of electrons-inside the semiconductor. The electrons are pumped by an externally injected current. At present, the wavelength of the emitted light ranges from 600 nm to 1,500 nm (1.5 $\mu$m). As a semiconductor laser for emitting light having a wavelength near 800 nm, a laser capable of obtaining a 10-W class light output alone is known.

Light output from such a high-light-output semiconductor laser has poor transverse mode properties, and the beam intensity distribution is not uniform. For this reason, wavelength conversion by a nonlinear crystal is low in efficiency.

On the other hand, the above high-light-output semiconductor laser has a focusing ability high enough to pump a solid-state laser. In addition, this laser has the following merits, which other types of laser sources do not have: it has a high light output as compared with input power, is compact, and allows fine adjustment of the oscillation output and the oscillation wavelength in accordance with the input current. Owing to these merits, the semiconductor laser is the most suitable for realizing a compact light source.

In general, a semiconductor laser is a box-like device each side of which is several cm. This device is capable of a light output of about 10 W. In addition, light from the device can be extracted via an optical fiber.

As the semiconductor laser 11 in this embodiment, for example, the above high-light-output semiconductor laser is used.

Although a semiconductor laser having a single transverse mode, unlike the above high-light-output semiconductor laser, is known, the output of the laser is low. At present, the maximum output of this device is about 200 mW. However, high-output lasers of this type are being developed. Such a semiconductor laser having a single transverse mode may therefore be used as the semiconductor laser 11 in this embodiment.

If this single transverse mode semiconductor laser is used as the semiconductor laser 11 in this embodiment, light output from the semiconductor laser 11 can be directly wavelength-converted into ultraviolet light by a nonlinear crystal. In this case as well, with the concurrent use of a plurality of lasers, which is a characteristic feature of the embodiment, optical damages to each nonlinear crystal can be reduced, and the temporal and spatial coherences can be decreased, as in the same manner in the embodiment.

The solid-state laser 13 will be described in detail next.

A solid-state laser is the general term for lasers having solid-state laser media. A semiconductor laser is one of the solid-state lasers. In general, however, a solid-state laser is a laser pumped by light. Such definition also applies herein.

In this embodiment, pumping light is obtained by the semiconductor laser 11. The solid-state laser 13 is constituted by a solid-state laser medium and an optical part such as a reflecting mirror. As will be described later, the solid-state laser 13 may incorporate a nonlinear crystal for wavelength conversion.

As the solid-state laser 13, for example, a laser having an Nd-doped yttrium aluminum garnet (Nd: YAG) as a laser medium and capable of emitting light having a wavelength of 1,064 nm is used. In this case, as the semiconductor laser 11 serving as a pumping source, a laser for emitting light having a wavelength near 808 nm is used.

If a high-output semiconductor laser for emitting bluish green light having a wavelength near 500 nm, which is being developed, can be used, a Ti-doped sapphire (Ti: Sapphire) can be used as a solid-state laser. Light emitted from the solid-state laser has a good transverse mode distribution characteristic (has single transverse mode). Wavelength conversion to a short wavelength can be efficiently performed by a nonlinear crystal.

The nonlinear crystal contained in the wavelength converting section 14 will be described in detail next, together with its wavelength conversion effect.

A crystal having a nonlinear susceptibility of second order, called a nonlinear optical crystal, e.g., $\beta$-$BaB_2O_4$ (BBO) or $LiB_3O_5$ (LBO), has the properties of converting light having a frequency $\omega_1$ (wavelength $\lambda_1$) into light having a frequency $2\omega_1$ (wavelength $\lambda_2 = \lambda_1/2$) (second harmonic generation) and generating light having a frequency $\omega_3 = \omega_1 + \omega_2$ (wavelength $\lambda_3$ given by $1/\lambda_3 = 1/\lambda_1 + 1/\lambda_2$) (sum frequency generation) from light having the frequency $\omega_1$ and light having a frequency $\omega_2$.

Wavelength conversion by these nonlinear crystals has its limit on the short wavelength side of converted wavelengths. One of the factors that determine the limit is that of the transmittance of each nonlinear crystal. The other factor is the limit of phase matching of the phase velocities of two types of light before and after conversion by the birefringence of the crystal.

BBO has its limit near 190 nm in terms of transmittance. With regard to transmittance, LBO is kept transparent up to near 155 nm, but cannot emit ultraviolet light upon generation of a second harmonic. LBO can emit light having a wavelength near 187 nm with the use of sum frequency generation of different wavelengths.

As a nonlinear optical crystal, $KBe_2BO_3F_2$ (KBBF) or $Sr_2Be_2B_2O_7$ (SBBO) can be used. With these crystals, ultraviolet light having shorter wavelengths can be generated.

The wavelength conversion efficiency based on a nonlinear optical effect is proportional to the intensity (power per unit cross-sectional area) of a fundamental wave. That is, light having a higher intensity can be converted with higher efficiency. In order to use this property, this embodiment uses one or a combination of the following three methods:
1. A laser beam to be incident on a nonlinear optical crystal is focused strongly by a condenser lens or reflecting mirror. For this operation, the solid-state laser, on which the operation is based, must have a single transverse mode.
2. A nonlinear crystal is inserted into a resonator, and the light intensity is increased by multiple reflection of light within the resonator, thereby improving the wavelength conversion efficiency. Practical examples of this method are: an intra-cavity method of inserting a nonlinear crystal into the resonator of a solid-state laser, and an external resonant cavity method of inserting a nonlinear crystal into a resonator disposed outside a solid-state laser in addition to a resonator disposed therein.
3. A laser beam is oscillated as pulse light to concentrate energy in a short period of time, thereby increasing instantaneous light intensity. In this method, a nonlinear crystal cannot be disposed in a resonator but can be used independently, and light may be passed therethrough in one direction.

The structures corresponding to the respective methods will be described in detail in the following embodiments.

One of the points that must be taken into consideration in realizing this embodiment is optical damages to a nonlinear crystal. That is, with an excessively high light intensity, a nonlinear crystal is damaged, deteriorating conversion efficiency. On the other hand, the light intensity must be increased to improve the conversion efficiency of the nonlinear crystal, making the apparatus design difficult.

It is known at present that almost no optical damages occur up to a certain light intensity. In the case of an actual ultraviolet laser, in generating continuous ultraviolet light (266 nm) by using BBO, damages are small at an ultraviolet light output of 100 mw, but become conspicuous at an output of 1 W or more.

In this embodiment, the overall ultraviolet laser source generates a light output of several watts, but the light output is shared by several to several hundred laser elements to suppress the output of each laser element to a low output. With this structure, a plurality of nonlinear crystals included in this embodiment are not susceptible to optical damages, allowing a long-term, stable operation.

In this embodiment, in consideration of the application of the laser source to an exposure unit, the following two conditions are required: the line width of the oscillation wavelength of each laser element must be 1 pm or less, and the differences in wavelength between the laser elements must be 1 pm or less.

In this embodiment, for example, the wavelength of each laser element is controlled in the following manner to satisfy the above two conditions.

Each laser element is adjusted to oscillate in only one longitudinal mode of several longitudinal modes (corresponding to oscillation wavelengths). For this purpose, the resonator length is adjusted, and an optical element having wavelength selectivity is inserted, as needed.

A typical oscillation line width in one longitudinal mode is 0.01 pm or less. Oscillation (single frequency operation) is therefore performed in one longitudinal mode to set the oscillation line width of each laser element to 1 pm or less, which is required.

The natural wavelength of a longitudinal mode appears periodically, and a wavelength separation $\Delta\lambda$ is given by:

$$\Delta\lambda=\lambda^2/(2L\cdot n) \qquad (2)$$

where 2L is the round-trip distance inside the laser resonator, n is the refractive index of the material inside the resonator, and $\lambda$ is the oscillation wavelength.

In a typical case of this embodiment, L=11.5 cm, a fundamental wave having a wavelength of 1,064 nm is used for the Nd: YAG, and 1.7 as the average refractive index of the Nd: YAG and the nonlinear crystal is used as n. In this case, the wavelength separation $\Delta\lambda$ is 2.9 pm. With the 231-nm fifth harmonic of this fundamental wave, the wavelength separation $\Delta\lambda$ is 0.6 pm.

In general, when one longitudinal mode is oscillated, a longitudinal mode having a wavelength exhibiting the maximum gain of the laser medium is oscillated. This wavelength is determined by the laser medium of interest. The wavelengths oscillated by a plurality of laser elements are near the natural wavelength of the laser medium. More specifically, the maximum difference in wavelength between the laser elements, with respect to the wavelength exhibiting the maximum gain of the solid laser medium, is only ½ the longitudinal mode spacing (in the above case, only ±0.6 pm/2=±0.3 pm).

If the resonator length L is smaller than the above value, since the mode spacing $\Delta\lambda$ increases, the oscillation wavelengths can be matched by adjusting the resonator length L of each laser element or the characteristics of each wavelength selection element.

In this embodiment, since light beams are emitted from a plurality of laser elements, the spatial coherence is low. This coherence is lower than that obtained when one beam is split into a plurality of light components as in a conventional laser. This is because a plurality of laser elements emit light beams having wavelengths which are very close to each other (the differences in wavelength are 1 pm or less), and the differences in wavelength are generally equivalent to about 1 GHz in frequency.

The oscillation frequencies of the respective laser elements automatically differ from each other by several hundred MHz to about 1 GHz or more. Near a wavelength of 200 nm, a wavelength difference of ±0.3 pm is equivalent to a frequency difference of ±2.2 GHz.

This means that bright and dark interference fringes are formed by light beams emitted from a plurality of lasers at a frequency of about 1 GHz. From the viewpoint of the exposure time scale of a semiconductor wafer, interference fringes caused between the respective laser elements are averaged and eliminated. This practically means that light beams emitted from the respective lasers do not interfere with each other.

In this embodiment, since the spatial coherence is decreased in the above manner, speckles can be more effectively reduced than in the prior art using a single beam solid-state laser.

Second Embodiment

Figure 2:
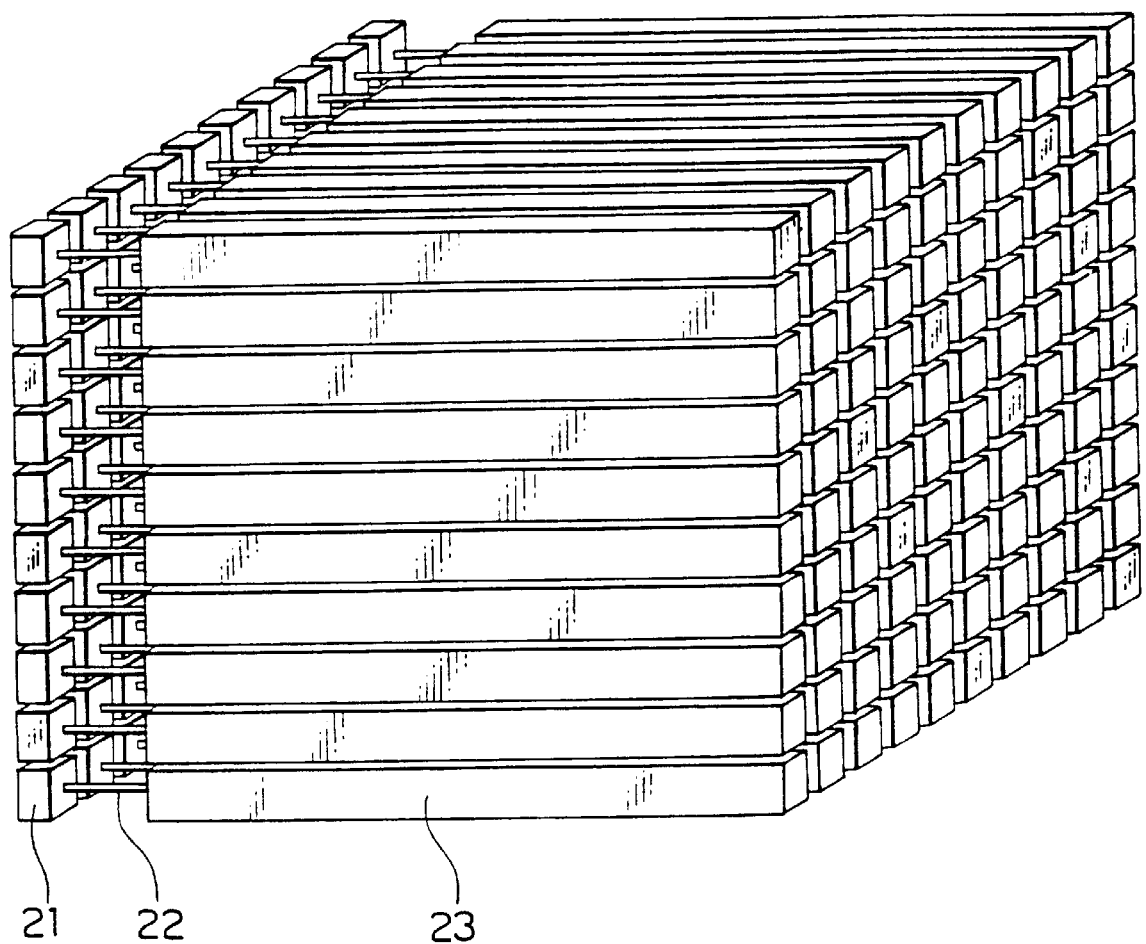
FIGS. 2 and 3 are drawings showing an ultraviolet laser source according to a second embodiment of the present invention.
Figure 3:
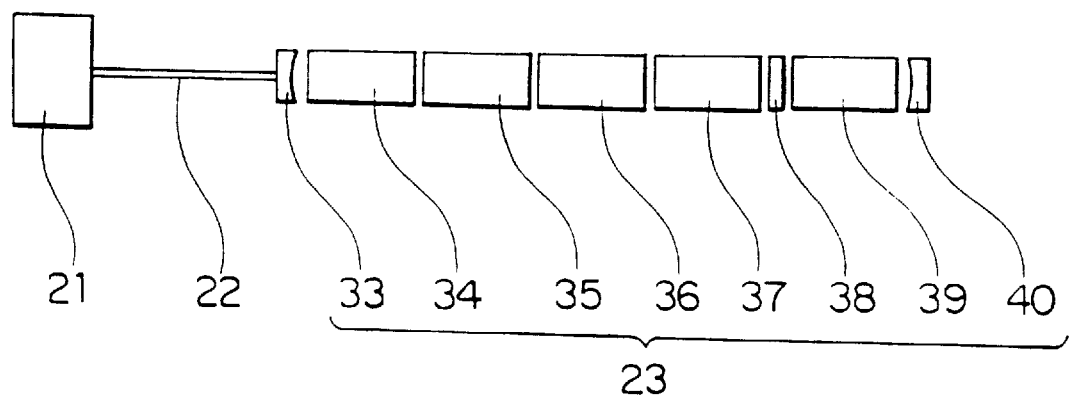

Another embodiment of the present invention will be described below with reference to FIGS. 2 and 3. FIG. 2 shows the overall structure of an ultraviolet laser source of this embodiment. FIG. 3 shows the structure of each laser element.

As shown in FIG. 2, the ultraviolet laser source of this embodiment is constituted by 10 (rows)×10 (columns) laser elements, i.e., a total of 100 laser elements. Each laser element includes a semiconductor laser 21 for emitting pumping light, an optical fiber 22 for transferring the pumping light, and an intra-cavity type solid-state laser 23 containing a nonlinear crystal.

The solid-state laser 23 emits continuous ultraviolet light having a wavelength of 213 nm to the right, and includes an Nd: YAG 34 as a laser medium, four nonlinear crystals 35, 36, 37, and 39 for wavelength conversion, reflecting mirrors 33 and 40, and a wave plate 38, as shown in FIG. 3.

In this embodiment, the ultraviolet light output of each laser element is expected to be about 100 mW (0.1 W), and the output of the overall light source of this embodiment is about 10 W. The solid-state laser 23 of each laser element has a cross-sectional area 3 by 3 mm square. A bundle of 100 laser elements constitute a light source 50 by 50 mm square. Each laser element is cooled by a cooling mechanism (not shown). The cooling mechanism may be designed such that each laser element is buried in a copper block, and the copper block is cooled by a cooler.

The optical fiber 22 is flexible and has a length of several cm to several m. The method of disposing each laser element can be arbitrarily changed. Since each semiconductor laser 21 is a several-cm cube (FIG. 2 is a reduced view), and the cross-sectional area of each solid-state laser 23 is several mm square, the respective laser elements are disposed making use of the flexibility of each optical fiber 22.

The solid-state laser 23 in this embodiment emits the fifth harmonic of input light. For example, this laser further converts a fourth harmonic emitted from a fourth harmonic laser, which has been reported, into a fifth harmonic.

As the semiconductor laser 21, a laser having an oscillation wavelength of 808 nm and an output of about 10 W at the outlet of the optical fiber 22 is used. Pumping light (wavelength: 808 nm) from the semiconductor laser 21 is guided to the laser resonator (corresponding to the components 33 to 40) of the solid-state laser 23 through the optical fiber 22 and is reflected by the reflecting mirror 33 to pump the Nd: YAG rod 34 as a laser medium.

The cross-sectional area of the Nd: YAG rod 34 is set to 3 mm square or less (may be a circular cross-section), and its length is set to about 10 mm. The reflecting mirror 33 exhibits a high transmittance with respect to the pumping light, and a high reflectance with respect to a 1,064-nm fundamental wave for the solid-state laser 23. The reflecting mirror 33 need not be a discrete part, and a reflecting film deposited on the left end face of the Nd: YAG rod 34 may substitute for the reflecting mirror.

The 1,064-nm fundamental wave (frequency $\omega$) emitted from the laser medium 34 is transmitted through the nonlinear crystals 35, 36, and 37, the wave plate 38, and the nonlinear crystal 39 to reciprocate in the laser resonator formed between the reflecting mirrors 33 and 40. The cross-sectional area of each nonlinear crystal is set to about 3 mm square, and its length is set to about 10 mm.

When the light of this fundamental wave reciprocates in this laser resonator, the fundamental wave loses its energy due to reflection and scattering on the end face of each nonlinear crystal, absorption therein, conversion of energy into harmonics, and the like. However, the light is amplified when it passes through the Nd: YAG rod 34 as a laser medium. As a result, the intensity of the fundamental wave in the resonator increases to several ten watts to several hundred watts.

When the fundamental wave passes through the nonlinear crystal 35 from left to right, a second harmonic having a wavelength of 532 nm (frequency $2\omega$) is generated (second harmonic generation; $\omega+\omega=2\omega$). As the nonlinear crystal 35, LBO is used. Although part of the energy of the fundamental wave is lost upon conversion, the absolute intensity of the wave is still high, and the high intensity can be maintained. In this case, the cutting direction of each LBO end face is determined to attain so-called type I phase matching. In type I phase matching, a second harmonic polarized in the horizontal direction is generated from the fundamental wave polarized in the vertical direction.

The generated second harmonic propagates to the right, together with the fundamental wave, and reaches the next nonlinear crystal (LBO) 36. Sum frequency generation of the second harmonic and the fundamental wave is performed to generate a third harmonic (wavelength: 355 nm). At this time, although the intensities of the second harmonic and the fundamental wave slightly decrease, the high intensity of the fundamental wave is still maintained. In this case, the LBO end face is cut to attain so-called type II phase matching. In type II phase matching, a third harmonic having a vertical component is generated from the fundamental wave in the vertical direction and the second harmonic in the horizontal direction. Although the third harmonic also has a horizontal component, this component is irrelevant to this embodiment.

With the next nonlinear crystal (LBO) 37, sum frequency generation of $\omega+3\omega=4\omega$ is performed to generate a fourth harmonic having a wavelength of 266 nm. In this case, type I phase matching is performed to polarize the fourth harmonic in the horizontal direction.

With the wave plate 38, the fourth harmonic is polarized in the vertical direction without changing the polarizing direction (vertical) of the fundamental wave. The vertically polarized fourth harmonic is incident on the nonlinear crystal (BBO) 39.

In the nonlinear crystal 39, type II phase matching is attained to perform sum frequency generation of $\omega+4\omega=5\omega$, thereby generating a fifth harmonic (wavelength: 213 nm). Even at the exit of the BBO 39, the high intensity of the fundamental wave is maintained. An output of about 100 mW is expected from the generated fifth harmonic.

At the right end of the solid-state laser 23 (laser resonator), the fundamental wave is reflected by the reflecting mirror 40 having wavelength selectivity to return into the laser resonator, while the generated fifth harmonic is transmitted through the reflecting mirror 40. Note that since the intensities of the second to fourth harmonics have decreased, they may be transmitted through or reflected by the reflecting mirror 40. The fundamental wave reflected by the reflecting mirror 40 propagates through the resonator in the opposite direction to be amplified by the Nd: YAG rod 34 again.

In this embodiment, anti-reflection films are formed on the end faces of the optical parts, i.e., the Nd: YAG rod 34, the nonlinear crystals 35, 36, 37, and 39, and the like in the laser resonator. Instead of forming the anti-reflection films, the respective optical parts may be disposed in tight contact with each other (bonding or optical contact) to prevent reflection. Alternatively, similar to the reflecting mirror 33, the reflecting mirror 40 may not be a discrete part, and a reflecting film deposited on the end face of the nonlinear crystal 39 may be used as a reflecting surface to substitute for the reflecting mirror 40.

In this embodiment, harmonics and fundamental wave components other than the fifth harmonic are also output through the reflecting mirror 40, even though they have low intensities. If these components are expected to adversely affect exposure, a filter is disposed outside the laser to remove them.

If each laser element in this embodiment does not oscillate in a single longitudinal mode, wavelength selection elements may be added.

According to this embodiment, there is provided an ultraviolet laser source that emits ultraviolet light having a wavelength of 213 nm, has a total output of about 10 W and a spectral line width of 1 pm or less, causes little damage to-each nonlinear crystal, and exhibits low spatial coherence.

Third Embodiment

Figure 4:
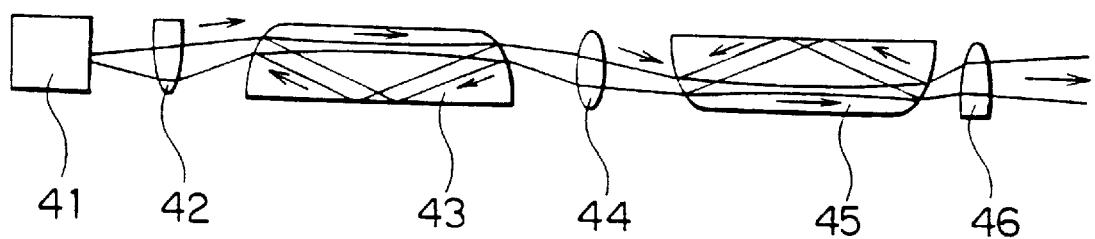
FIG. 4 is a drawing showing an ultraviolet laser source according to a third embodiment of the present invention.

Still another embodiment of the present invention will be described below with reference to FIG. 4. FIG. 4 shows the structure of each laser element in this embodiment, and the propagation route of a laser beam in each laser element.

An ultraviolet laser source of this embodiment is constituted by a bundle of a plurality of laser elements, as in the second and third embodiments shown in FIGS. 2 and 3, and has an optical structure like the one shown in FIG. 4. That is, each laser element in this embodiment includes a compact laser 41 for emitting a laser beam having a long wavelength, nonlinear crystals 43 and 45 for wavelength conversion, and lenses 42, 44, and 46 respectively disposed between the compact laser 41 and the nonlinear crystal 43, between the nonlinear crystal 43 and the nonlinear crystal 45, and on the exit side of the nonlinear crystal 45.

In this embodiment, as the compact laser 41, a single transverse mode semiconductor laser 41 having an output of about 150 mW and designed to emit light having a wavelength of 820 nm is used, and an external resonant cavity method is used as a wavelength conversion method.

As an external resonant cavity method, for example, a method of performing wavelength conversion from 856 nm to 428 nm is available, as disclosed in W. J. Kozlovsky, W. Lenth, E. E. Latta, A. Moser and G. L. Bona, "Generation of 41 mW of blue radiation by frequency doubling of a GaAlAs diode laser", Applied Physics Letters, Vol. 56, p. 2291, (1990). Each laser element in this embodiment uses such an external cavity resonant method to perform two-step conversion, i.e., from 820 nm to 410 nm and from 410 nm to 205 nm.

In this embodiment, light having a wavelength of 820 nm and emitted from the semiconductor laser 41 is incident on the nonlinear crystal 43 upon adjustment of the direction and convergence angle of the light by the lens 42. In this case, as the nonlinear crystal 43, LBO is used.

The left and right end faces of the nonlinear crystal 43 are polished into convex mirror surfaces inclined as shown in FIG. 4, and a reflecting film having wavelength selectivity is formed on each end face to exhibit a high reflectance with respect to a fundamental wave having a wavelength of 820 nm, and a high transmittance with respect to a second harmonic having a wavelength of 410 nm. The nonlinear crystal 43 has a cross-sectional area about 5 mm square and a length of about 15 mm.

A ring resonator structure is formed inside the nonlinear crystal 43. That is, the nonlinear crystal 43 has a structure (ring resonator) in which light is confined in a triangular form by using total reflection on the left and right end faces and the lower surface polished into a flat surface. Such a resonator consisting of one crystal is called a monolithic resonator.

The intensity of the 820-nm fundamental wave incident on the nonlinear crystal 43 is increased in this resonator structure, and generation of a second harmonic having a high intensity occurs strongly at a beam position in the horizontal direction where the beam is focused most. As a result, 410-nm light of the second harmonic is generated in the horizontal direction (to the right).

Most of the generated second harmonic emerges from the right end of the nonlinear crystal 43. The angle and convergence angle of this harmonic are then adjusted through the lens 44. The resultant harmonic is then incident on the next nonlinear crystal 45. Meanwhile, most of the 820-nm fundamental wave is confined in the nonlinear crystal 43, and hence the intensity of a fundamental wave component emerging from the right end face is low.

As the nonlinear crystal 45, BBO is used. Reflecting films each having wavelength selectivity are formed on the left and right end faces of the nonlinear crystal 45 to exhibit a high reflectance with respect to a second harmonic having a wavelength of 410 nm, and a high transmittance with respect to a fourth harmonic having a wavelength of 205 nm. The nonlinear crystal 45 is also a monolithic resonator having the same structure as that of the nonlinear crystal 43. The nonlinear crystal 45 generates a fourth harmonic having a wavelength of 205 nm from the 410-nm second harmonic upon generation of the second harmonic, and causes the generated fourth harmonic to exit from the right end face. The size of the nonlinear crystal 45 is set to be similar to that of the nonlinear crystal 43.

The generated fourth harmonic is incident on the lens 46 to be adjusted in the direction and convergence angle. The resultant harmonic is output as an ultraviolet laser output. The final 205-nm ultraviolet light emitted from each laser element is expected to have an output of about 50 mW.

As an arrangement for matching the resonance wavelength of the two nonlinear crystal monolithic cavities with the oscillation wavelength of the semiconductor laser, for example, a known servo control electric circuit may be used, as disclosed in L. Y. Liu, M. Oka, W. Wiechmann and S. Kubota, "Longitudinally diode-pumped continuous-wave 3.5-W green laser", Optics Letters, Vol. 19, p. 189 (1994).

In general, the resonance line width of the monolithic cavities is sufficiently smaller than 1 pm. In addition, the differences in wavelength between laser elements can be decreased by selecting one of a plurality of semiconductor lasers having an oscillation wavelength to be used, and matching the sizes of the nonlinear crystals of the respective laser elements with each other.

If the resultant wavelength uniformity is not sufficient, wavelength selection elements such as etalons may be inserted, or a known method called injection lock of irradiating light as a seed onto each semiconductor laser may be used to attain wavelength uniformity between the respective laser elements.

According to the ultraviolet laser source of this embodiment, a total ultraviolet light output of about 5 W can be expected with 100 laser elements. If a laser for emitting light having a wavelength of 772 nm is used as the compact laser 41, the resultant fourth harmonic has a wavelength of 193 nm, which is equal to that obtained from an ArF excimer laser. In this case, this laser can substitute for the excimer laser. As a crystal for generating a fourth harmonic, KBBF is used.

Fourth Embodiment

Figure 5:
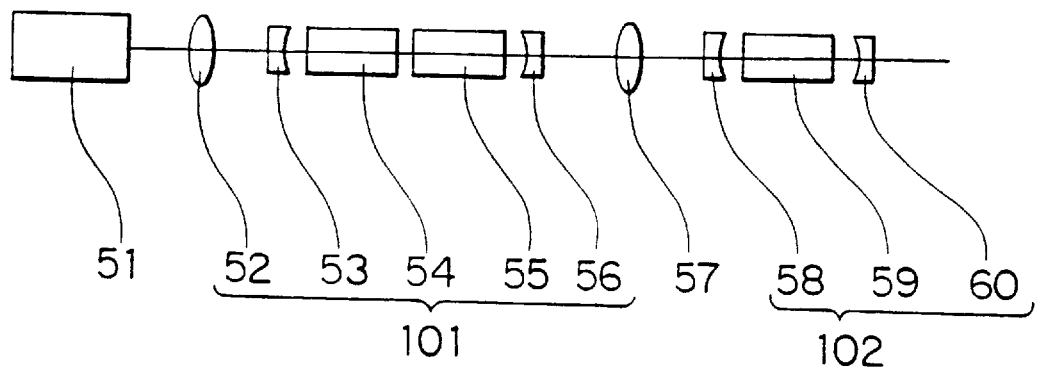
FIG. 5 is a drawing showing an ultraviolet laser source according to a fourth embodiment of the present invention.

An ultraviolet laser source according to still another embodiment of the present invention will be described below with reference to FIG. 5.

Similar to the second embodiment, the ultraviolet laser source of this embodiment is constituted by a bundle of a plurality of laser elements arranged parallel to each other. Each laser element has an optical structure like the one shown in FIG. 5.

More specifically, each laser element includes a semiconductor laser 51 for emitting pumping light, a laser resonator (solid-state laser) 101 pumped by pumping light to emit light of a fundamental wave and converting the fundamental wave into a harmonic, a wavelength converting section 102 having an external resonant cavity structure for converting the second harmonic into a fourth harmonic, and a condenser lens 57 disposed between the laser resonator 101 and the wavelength converting section 102.

The laser resonator 101 has a lens 52, reflecting mirrors 53 and 56, an Nd: YAG rod 54 as a solid-state laser medium, and a nonlinear crystal 55 for wavelength conversion. The wavelength converting section 102 has a nonlinear crystal 59 for wavelength conversion and reflecting mirrors 58 and 60 disposed on the two sides of the nonlinear crystal 59.

Pumping light having a wavelength of 808 nm (output: 3 w) from the semiconductor laser 51 is focused by the lens 52 and is incident on the Nd: YAG rod 54 through the reflecting mirror 53. In this case, similar to the embodiment in FIG. 3, an optical fiber may be used to guide the light from the semiconductor laser to the reflecting mirror.

A reflecting film is formed on the reflecting mirror 53 to exhibit a high transmittance with respect to the 808-nm pumping light, a high reflectance with respect to 1,064-nm light, and a high transmittance with respect to 532-nm light. The pumping light from the semiconductor laser 51 is incident on the Nd: YAG rod 54 to generate a fundamental wave having a wavelength of 1,064 nm. The Nd: YAG rod 54 has a cross-sectional area about 3 mm square and a length of about 10 mm.

The generated fundamental wave is incident on the nonlinear crystal 55 to be converted into a second harmonic. The nonlinear crystal 55 contains a nonlinear crystal KTiOPO$_4$ (KTP) 55 for generating a second harmonic, and has almost the same size as that of the Nd: YAG rod 54.

A reflecting film is formed on the reflecting mirror 56 to exhibit a high reflectance with respect to the 1,064-nm fundamental wave, and a high transmittance with respect to the 532-nm second harmonic. In addition to the above structure, the laser resonator 101 also includes a wave plate and a polarizing element (neither of which is shown) for a single longitudinal mode.

In this embodiment, the 1,064-nm fundamental wave having a high intensity is confined in the laser resonator 101, and the 532-nm second harmonic is generated by the nonlinear crystal 55. This second harmonic emerges from the reflecting mirror 56.

A reflecting film may be formed on the left end face of the laser medium 54 to substitute for the reflecting mirror 53 in this embodiment. Similarly, a reflecting surface may be formed on the right end of the nonlinear crystal 55. to substitute for the reflecting mirror 56.

The convergence angle of the 532-nm light of the second harmonic emerging from the laser resonator 101 is adjusted by a lens 57. The resultant light is incident on the wavelength converting section 102 (to be referred to as an external resonator hereinafter) containing the nonlinear crystal 59 and constituting a resonator structure. As the nonlinear crystal 59, BBO is used. The 532-nm harmonic light incident on the external resonator 102 is converted into fourth harmonic light having a wavelength of 266 nm.

Note that a known electric servo circuit may be used to tune the resonance wavelength of the external resonator 102 to the wavelength of light generated by the laser resonator 101. In addition, the two end faces of the nonlinear crystal 59 may be processed or reflecting films may be formed thereon to substitute for the reflecting mirrors 58 and 60.

According to this embodiment, when a laser having an output of about 3 W is used as the semiconductor laser 51, a light output of about 100 mW can be expected as 266-nm ultraviolet light finally output from each laser element.

Fifth Embodiment

Figure 6:
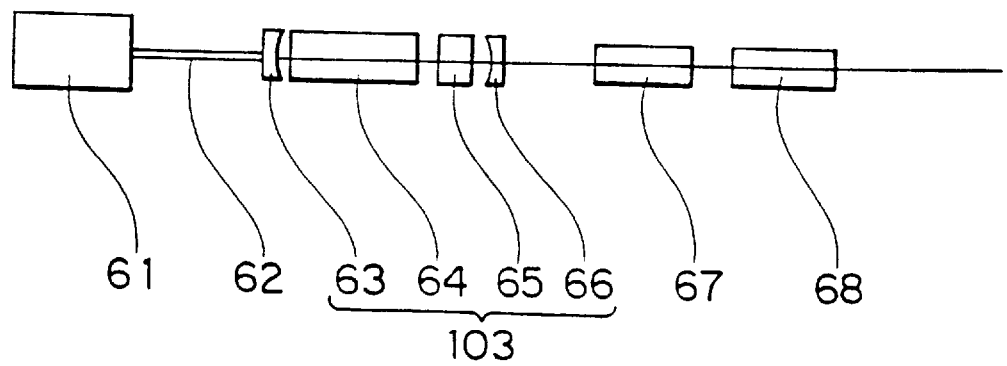
FIG. 6 is a drawing showing an ultraviolet laser source according to a fifth embodiment of the present invention.

An ultraviolet laser source according to still another embodiment of the present invention will be described below with reference to FIG. 6. This embodiment uses pulse light in place of continuous light used in the embodiments in FIGS. 3 to 5.

Similar to the embodiment in FIG. 2, the ultraviolet laser source of this embodiment is constituted by a bundle of a plurality of laser elements arranged parallel to each other. Each laser element has an optical structure like the one shown in FIG. 6.

More specifically, each laser element in this embodiment includes a pulse laser based on the known Q-switching method, a nonlinear crystal 67 for conversion to a second harmonic, and a nonlinear crystal 68 for conversion to a fourth harmonic.

The pulse laser is constituted by a semiconductor laser 61, an optical fiber 62, and a solid-state laser (laser resonator) 103. The laser resonator 103 includes a laser medium 64, a modulator 65, and reflecting mirrors 63 and 66 disposed on the two sides of the components 64 and 65.

Pumping light from the semiconductor laser 61 is guided to the laser resonator 103 through the optical fiber 62 and passes through the reflecting mirror 63 to pump the Nd: YVO$_4$ crystal 64 as a laser medium. Note that the pumping light may be focused by a lens to be guided to the laser resonator 103 without using the optical fiber 62, as in the embodiment shown in FIG. 5.

The laser resonator 103 incorporates the modulator 65 based on an acousto-optic effect, and generates pulse light having a wavelength of 1,064 nm by the so-called Q-switching method. The generated pulse light has a pulse width of about 10 ns. The energy of one pulse is about 10 $\mu$J, and the repeating frequency of pulses is about 10 kHz. According to this structure, the average energy output is about 1 W.

Since the pulse light output from the laser resonator 103 has a high peak output, efficient wavelength conversion can be performed without using any resonator structure for wavelength conversion.

In this embodiment, the 1,064-nm fundamental wave emerging from the laser resonator 103 is converted into a second harmonic having a wavelength of 532 nm by the first nonlinear crystal (KTP) 67. The second nonlinear crystal (BBO) 68 serves to generate 266-nm ultraviolet light of a fourth harmonic. In addition, 213-nm ultraviolet light can be generated by performing sum frequency generation of the fundamental wave and the fourth harmonic using BBO.

In this case, in order to further improve the wavelength conversion efficiency, a laser beam may be passed through the nonlinear crystal after it is focused by a condenser lens.

According to the structure of each laser element in this embodiment, as a 266-nm ultraviolet light output (average output) to be finally obtained, an output of about 100 mW is expected. With a bundle of 10×10 laser elements, i.e., 100 laser elements, a total output of about 10 W can be expected from the overall ultraviolet laser source.

According to this embodiment, there is provided an ultraviolet light source having merits such as compactness, low spatial coherence, and one that the easy maintenance, and one that can emit pulse light.

In this embodiment, since pulse light is used, the spectral line width is broad if no adjustments are made. More specifically, the line width of output ultraviolet light is about 100 pm. For this reason, this embodiment is used for an achromatic exposure unit.

However, the spectral line with can be decreased to 1 pm or less by using a know method called injection lock.

Sixth Embodiment

In a laser source of the present invention, a laser beam emitting section is constituted by a bundle of a plurality of laser elements for emitting laser pulse light to increase the laser beam output of the overall laser source. In addition, the emission timing of pulse light from each laser element is controlled to decrease coherence while suppressing the peak power of pulse light to be output.

In the present invention, the emission timing of each laser element is determined by an electrical signal (trigger signal) generated by a timing adjusting section. Such trigger signals are input to the laser element at different timings to prevent the emission timings of a predetermined number of laser elements or more of all the laser elements from coinciding with each other.

By shifting the emission timings of the respective lasers from each other, the spontaneous power (peak power) of light received by an optical system disposed after the light source can be suppressed, and any damages to the optical system can be prevented.

Since output pulse light beams from the respective laser elements are separate from each other along the time axis, the beams do not interfere with each other. The overall coherence of the laser source is therefore decreased, and generation of speckles is suppressed.

In addition, since a plurality of laser elements are sequentially selected one by one or randomly to emit light, the optical load imposed on each laser element can be reduced. As a result, the service life of each laser element can be prolonged, and the service life of the overall laser source can also be prolonged.

In the laser source of the present invention, light from a single laser source exhibiting a narrow oscillation spectral line width is used, and a known injection seed method is applied to each laser element, thereby decreasing the oscillation spectral line width of each laser element, and making the oscillation wavelengths of the respective laser elements coincide with each other. As the injection seed method, for example, the method disclosed in Walter Koechner, "Solid-State Laser Engineering", 3rd Edition, Springer Series in Optical Sciences, Vol. 1, Springer-Verlag, ISBN 0-387-53756-2, pp. 246–249 is used.

In general, when injection seed from a signal laser is performed while the emission timings of a plurality of laser elements remain the same, pulse light beams emitted from the respective laser elements have high coherence. As a result, the coherence of the laser source becomes high, and problems such as generation of speckles arise. In the present invention, however, since the emission timings are controlled in the above manner, the above problems are not posed even if injection seed is performed.

A laser source according to the sixth embodiment of the present invention will be described in detail below with reference to FIGS. 7 to 10.

Figure 7:
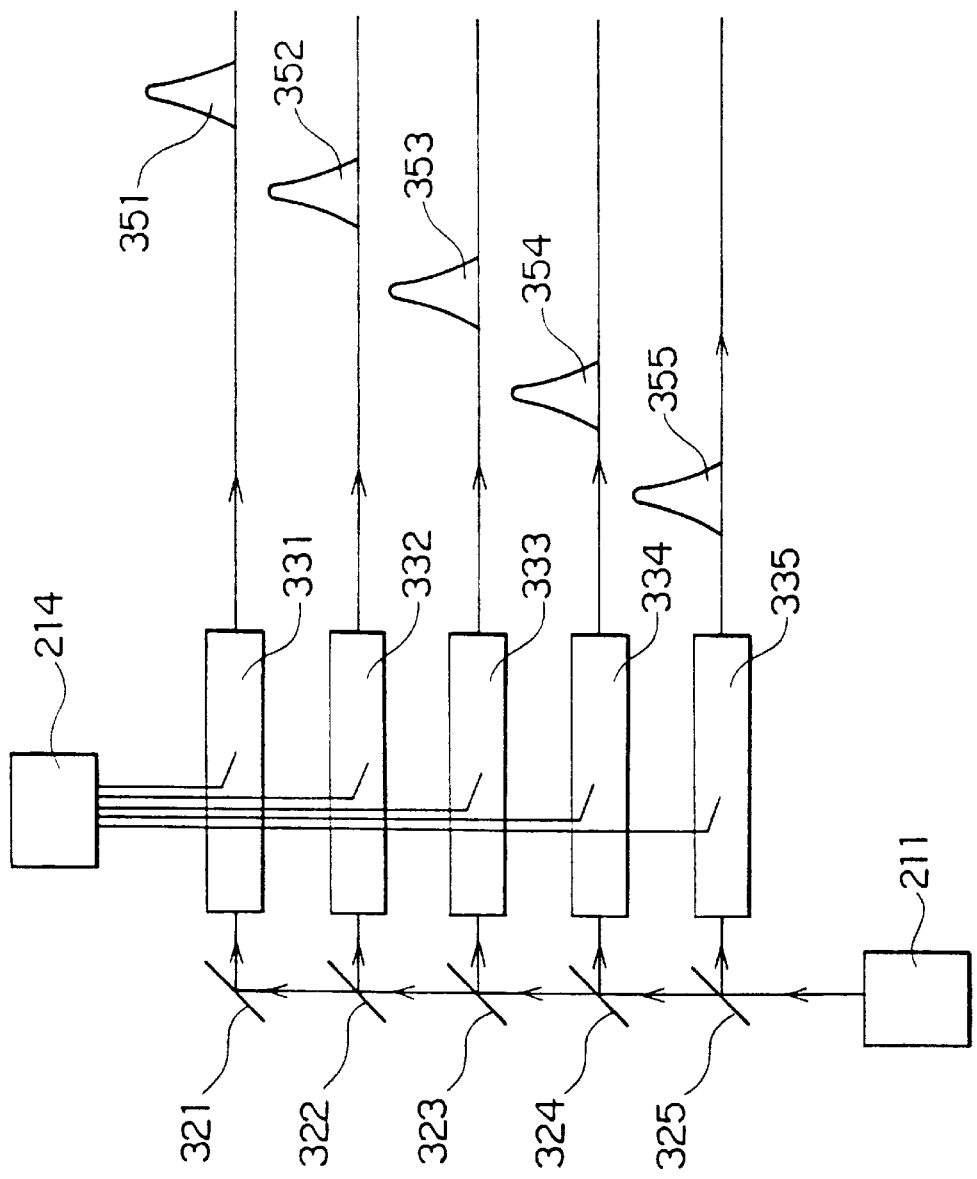
FIGS. 7–10 are drawings showing an ultraviolet laser source according to a sixth embodiment of the present invention.

In this embodiment, for example, as shown in FIG. 7, the laser source includes pulse laser sections 331 to 335 for respectively emitting laser pulse beams 351 to 355, a trigger signal generator (timing adjusting section) 214 for controlling the emission timing of each pulse laser section, a YAG laser source 211 for emitting continuous seed light for injection seed, and an optical system for guiding the seed light to each pulse laser section. This optical system is constituted by a total reflection mirror 321 and semitransparent mirrors 322 to 325.

In this embodiment, a single laser element is constituted by the YAG laser source 211 and a pair of an optical system and a pulse laser section (e.g., the total reflection mirror 321 and the pulse laser section 331).

Figure 8:
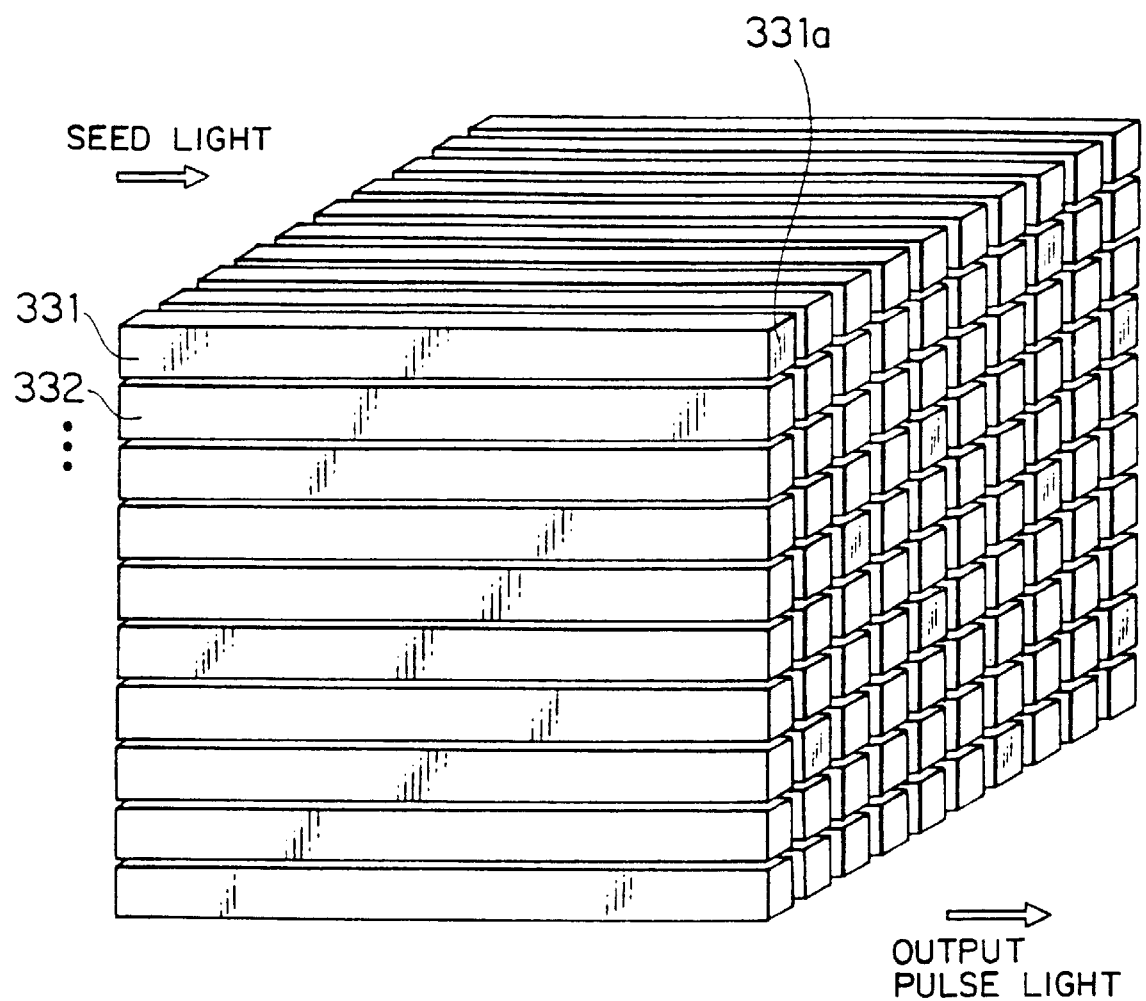
Figure 9:
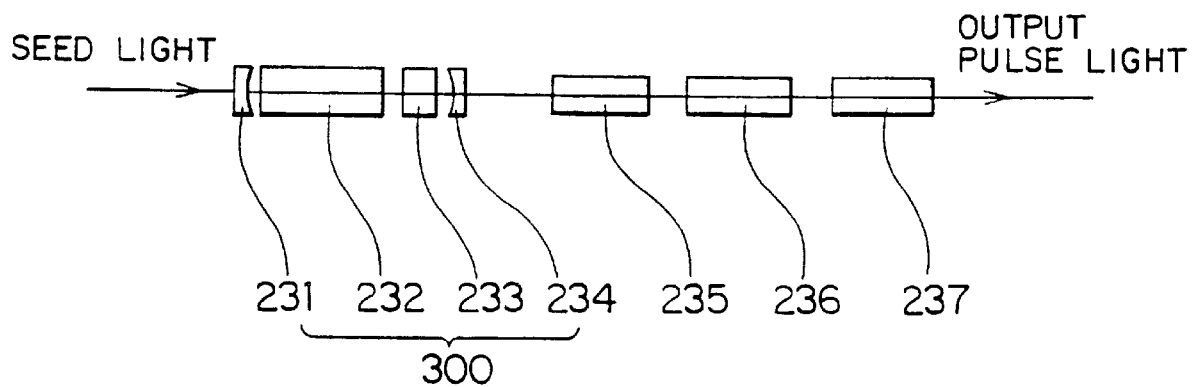

FIG. 7 schematically shows the structure of the laser source including five laser elements. In practice, however, for example, as shown in FIG. 8, 100 pulse laser section 331, . . . are arranged parallel to each other such that their exit end faces 331a, . . . are arranged in the form of a 10×10 matrix. As is apparent, however, the present invention can be applied regardless of the number and arrangement of laser elements to be used.

Each pulse laser section is a semiconductor-laser-pumped YAG laser, which performs pulse oscillation by the so-called Q-switching method. For example, each pulse laser section has a structure like the one shown in FIG. 9. That is, each pulse laser section includes a solid-state laser (laser resonator) 300, a nonlinear crystal (e.g., LBO) 235 for conversion to a second harmonic, a nonlinear crystal (e.g., BBO) 236 for conversion to a fourth harmonic, and a nonlinear crystal (e.g., BBO) 237 for conversion to a fifth harmonic.

The solid-state laser 300 includes an Nd: YAG rod 232 as a laser medium, a modulator 233 based on an acousto-optic effect, and reflecting mirrors 231 and 234 disposed on the two sides of the components 232 and 233. There is a semiconductor laser for the pumping, which is not shown in the figure.

The solid-state laser 300 emits a fundamental wave having a wavelength of 1,064 nm, a pulse width of about 10 ns, and a pulse repeating frequency of about 10 kHz by the Q-switching method. The average output energy of this laser is about 1 W. The fundamental wave emitted from the solid-state laser 300 is converted into a 532-nm second harmonic by the first nonlinear crystal 235. The second harmonic is converted into a 266-nm fourth harmonic by the second nonlinear crystal 236. Sum frequency generation of the fundamental wave and the fourth harmonic is performed by using the third nonlinear crystal 237 to convert the fourth harmonic into a 213-nm fifth harmonic.

In this case, in order to further improve the wavelength conversion efficiency, the pulse light from the solid-state laser 300 may be passed through the nonlinear crystal 235 after it is focused by a condenser lens.

In this embodiment, the trigger signal generator 214 for controlling the emission timings sequentially supplies trigger signals for designating emission timings to the respective pulse laser sections. For example, these trigger signals are supplied at 20-ns intervals. Since this interval is longer than the pulse width (10 ns) of pulse light emitted from each pulse laser section, pulse light beams emitted from the different pulse laser sections are separate from each other along the time axis and hence do not interfere with each other.

Referring to FIG. 7, the curves 351 to 355 respectively represent the spatial intensity distributions of pulse light beams emitted from the pulse laser sections 331 to 335 on the respective optical axes. These spatial distributions also correspond to the time distributions of pulse emission. In this embodiment, since the pulse time width is 10 ns, the spatial pulse length is about 3 m. In addition, since the pulse emission interval is 20 ns, the centers of the respective pulses are separate from each other by about 6 m.

When the method of sequentially causing the pulse laser sections to emit light is applied to a laser source constituted by 10×10 pulse laser sections, i.e., a total of 100 pulse laser sections, it takes 2 $\mu$s to complete emission of light from all the 100 pulse laser sections. In addition, since the pulse repeating frequency in each pulse laser section is 10 kHz, the emission interval of each pulse laser section is 100 $\mu$s. Therefore, there is a time margin of 98 $\mu$s in the interval between the instant at which the last pulse laser section of the 100 pulse laser sections of the laser source emits light and the instant at which the first pulse laser section emits light.

As described above, since the respective pulse laser sections are sequentially caused to emit pulse light beams such that the beams do not overlap each other, the above light source can be regarded as a light source in which the laser elements corresponding to the respective pulse laser sections exhibit no coherence. When an ultraviolet laser source constituted by such laser elements is regarded as a single light source, the coherence of a laser beam emitted from the light source can be suppressed to a low level.

In this embodiment, the trigger signal generator 214 controls the emission timings to sequentially cause a plurality of pulse laser sections to emit light. The emission order of the respective pulse laser sections in the present invention is not limited to this.

More specifically, in this embodiment, after a given pulse laser section is caused to emit light, another pulse laser section, which is spatially adjacent to the given pulse laser section, is caused to emit light. Instead of this operation, however, one of the remaining pulse laser sections that have not been caused to emit light during the emission period of the given pulse laser section may be randomly selected, and the selected pulse laser section may be cause to emit light. In this case, the emission period indicates an interval during which the laser source constituted by a plurality of laser elements, regarded as a signal laser source, should keep emitting light.

In addition, in this embodiment, the emission timings are controlled to prevent two emitted pulses from overlapping each other. However, the present invention is not limited to this. For example, in a system in which the intensity of light emerging from an optical system that receives pulse light emitted from the laser source of this embodiment is relatively high, and generation of some speckles can be permitted, the emission timings may be controlled such that two pulses emitted successively overlap, or pulse light beams are simultaneously emitted from two or more laser elements.

Since pulse light is used in the laser source of the present invention, according to the general pulse emission method, the spectral line width of output pulse light becomes broad, and may become about 100 pm with respect to the line width of ultraviolet light assumed in the present invention, in particular. In order to solve this problem, the laser source of this embodiment performs injection seed.

More specifically, light from the solid-state laser 211 for emitting continuous light having a small spectral line width of 0.1 pm or less is guided to the pulse laser sections 331 to 335 by using optical systems constituted by the semitransparent mirrors 322 to 325 and the total reflection mirror 321, thereby performing injection seed.

In this embodiment, by performing the above injection seed, the oscillation spectral width at each pulse laser section can be decreased to 0.5 pm or less. In addition, the oscillation wavelength of at each pulse laser section can be matched with the wavelength of seed light from the solid-state laser 211.

According to the ultraviolet laser source constituted by a plurality of pulse laser sections like those shown in FIG. 7 or 8, by supplying seed light from the signal laser source to each pulse laser section, the spectral width of the wavelength of output ultraviolet pulse light can be set to 0.5 pm or less.

As the YAG laser source 211 and the laser medium (see FIG. 9) of each pulse laser section, YLF, YVO$_4$, and the like can be used, in addition to YAG. Note that the YAG laser source 211 and the laser medium 232 to be combined must be materials whose oscillation wavelengths can be matched.

Figure 10:
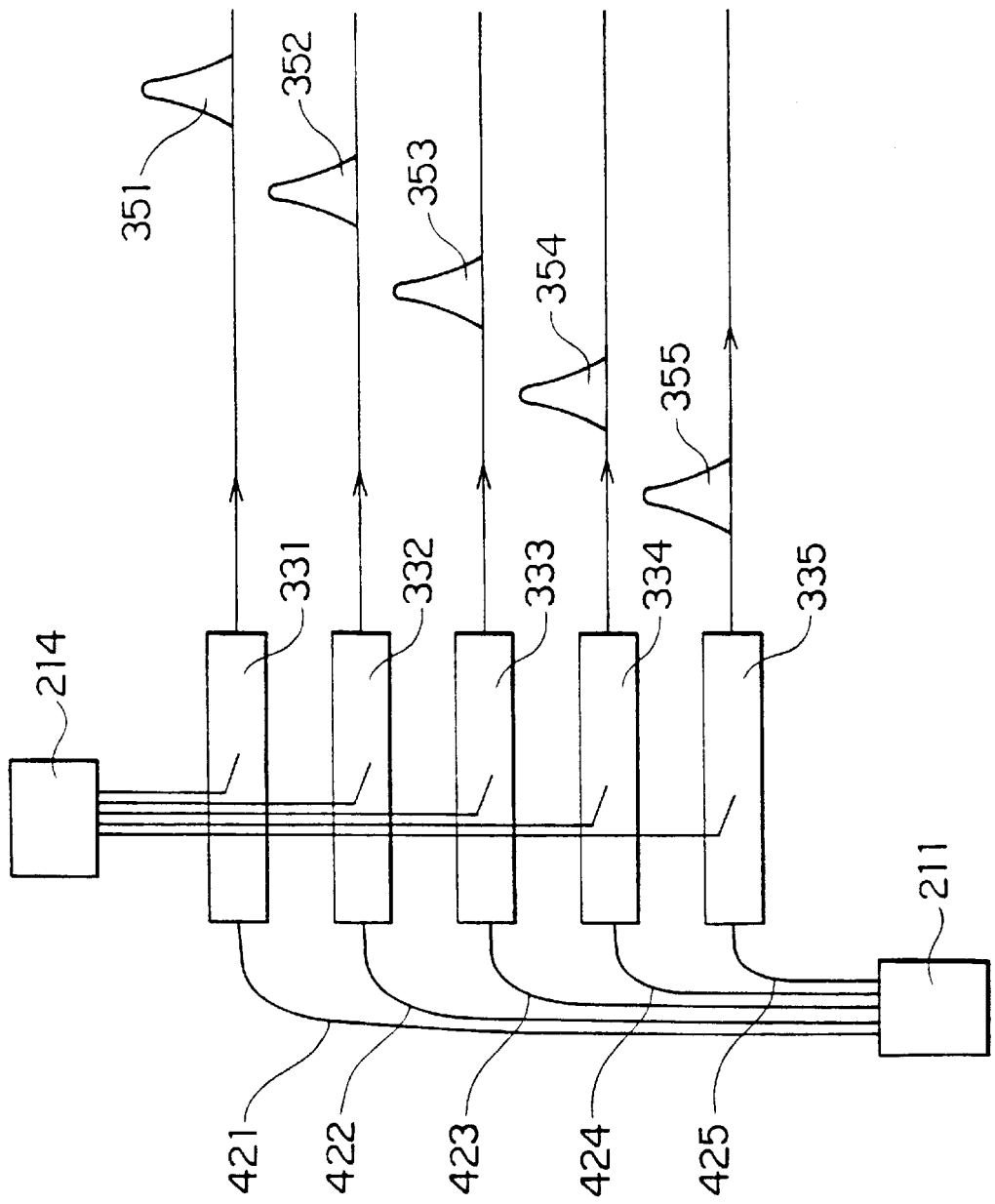

In this embodiment, seed light beams from the YAG laser source 211 are guided to the respective pulse laser sections through the optical systems constituted by the semitransparent mirrors, the total reflection mirrors, and the like. There is a semiconductor laser for the pumping, which is not shown in the figure. However, as shown in FIG. 10, seed light beams may be guided to the pulse laser sections 331 to 335 through optical fibers 421 to 425.

In this embodiment, pulse light output from each pulse laser section is ultraviolet light. However, the present invention can be applied to a laser source constituted by a plurality of laser elements regardless of the wavelength of laser pulse light to be output.

Seventh Embodiment

A laser source according to the seventh embodiment of the present invention will be described next with reference to FIGS. 11 to 13.

The laser source of this embodiment has the same structure as that of the sixth embodiment, but uses a different method of adjusting the emission timings using a trigger signal generator 214. The difference between the adjusting methods will be described below, but a description of the same structure as that of the sixth embodiment will be omitted.

The emission timing adjusting method assumed in the sixth embodiment will be described in more detail first. For the sake of descriptive convenience, in this embodiment, it is assumed that the laser source is constituted by 10 pulse laser sections. However, the number of pulse laser sections (laser elements) is not limited to this.

Figure 11:
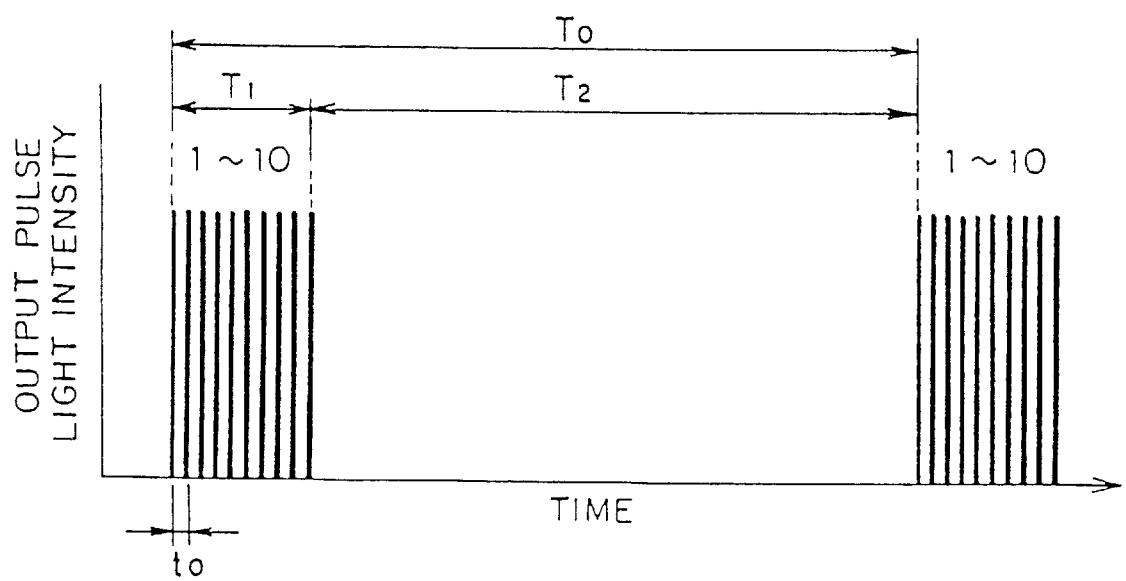
FIGS. 11–13 are drawings showing an ultraviolet laser source according to the seventh embodiment of the present invention.

FIG. 11 shows the emission timings in the laser source of the sixth embodiment. FIG. 11 qualitatively shows the time points at which pulse light beams 1 to 10 are emitted from the 10 pulse laser sections. As shown in FIG. 11, in the sixth embodiment, one emission interval $T_0$ is constituted by an intensive emission interval $T_1$ in which pulse beams are sequentially emitted from the respective pulse laser sections, and a subsequent non-emission interval $T_2$ in which no pulse light beams are emitted. For this reason, in the sixth embodiment, when the laser source of the sixth embodiment is used for an exposure unit, different total exposure amount calculating methods must be used depending on whether the exposure start and end times are within the intensive emission interval $T_1$ or the non-emission interval $T_2$.

Figure 12:
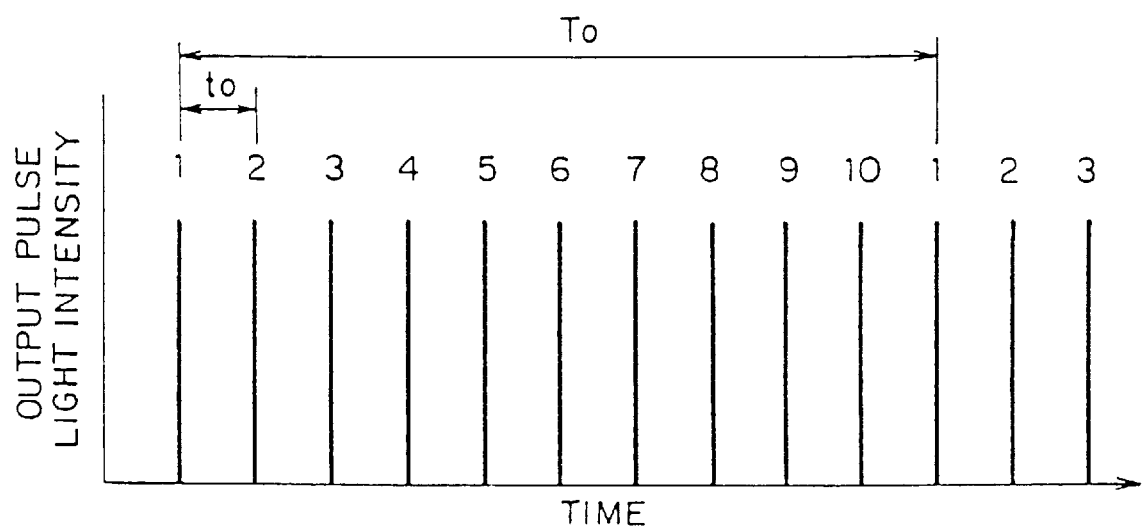

In contrast to this, in the laser source of this embodiment, as shown in FIG. 12, the emission timings are adjusted such that emission intervals $t_0$ between pulse light beams become uniform. With this adjustment, the above intensive emission interval $T_1$ in which pulse light beams are emitted and the non-emission interval $T_2$ in which no pulse light beams are emitted can be eliminated.

With the emission timing adjustment shown in FIG. 12, the exposure time is almost proportional to the total exposure amount. For this reason, by using the laser source of this embodiment, exposure amount control is facilitated, and exposure can be started or stopped at an arbitrary time point.

Assume that the average power of the respective pulse laser sections is 0.5 W, the repeating frequency is 10 kHz, i.e., a pulse emission interval $t_1$ at each pulse laser section is 100 µs, and the energy of one pulse is 50 µJ.

In this case, a value obtained by dividing the pulse emission interval $t_1$ at one pulse laser section by the number (N) of pulse laser sections included in the laser source, i.e., 10 µs (=$t_1$/N=100 µs/10), is set to be an interval $t_0$ between pulse light beams sequentially emitted from different pulse laser sections.

By setting the emission timings in the above manner, the pulse emission interval $t_0$ always becomes constant from the viewpoint of the overall laser source, as shown in FIG. 12. Consequently, when the laser source of this embodiment is used for an exposure unit, the exposure amount can be controlled with the resolving power of one pulse by controlling the exposure time. In this embodiment, since the energy of a single laser pulse is 50 µJ, the exposure amount can be controlled within an error range of 50 µJ.

Figure 13:
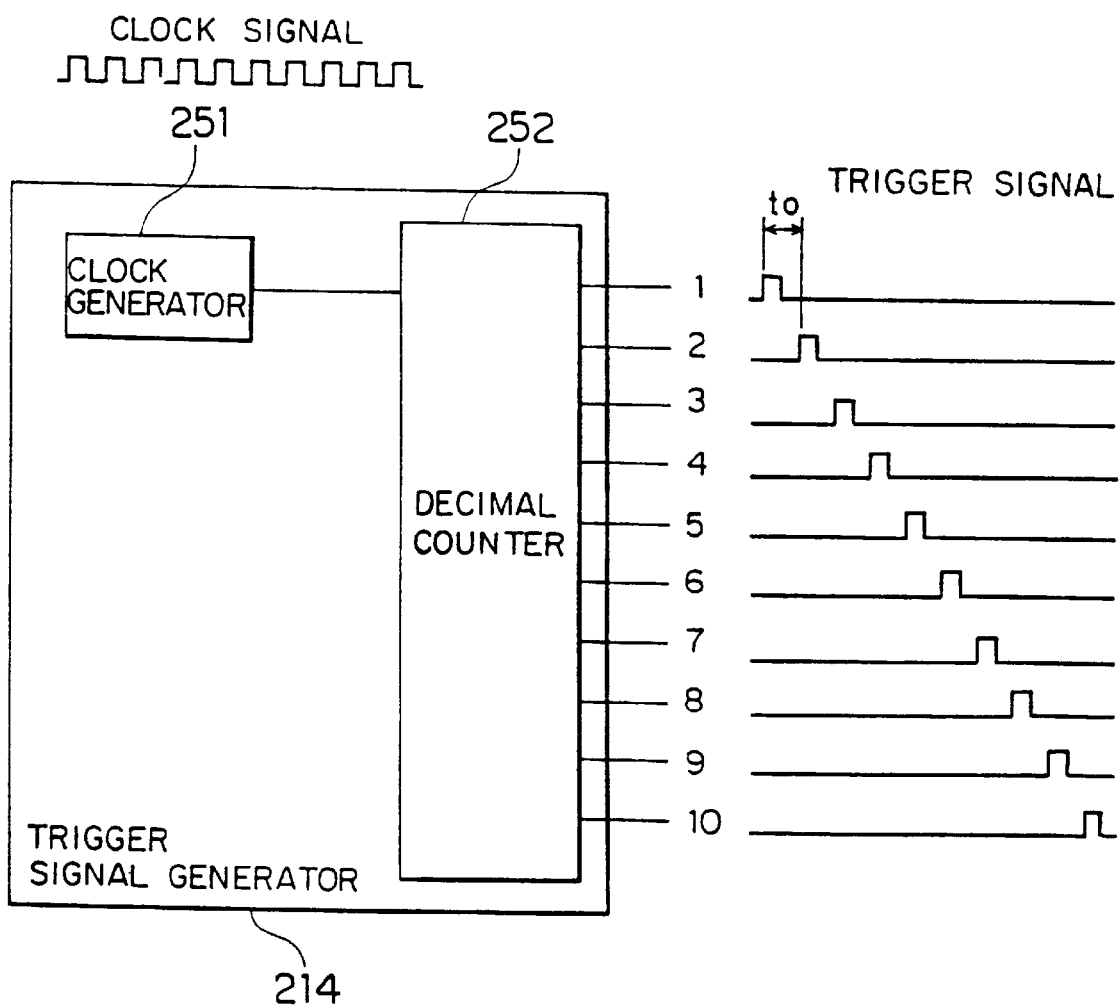

For example, as shown in FIG. 13, the trigger signal generator 214 for controlling the emission timings of the laser source of this embodiment is constituted by a clock generator 251 for generating a clock signal having a period corresponding to the pulse interval $t_0$, and a decimal counter 252 for outputting trigger signals, shifted from each other by the interval $t_0$, to the 10 pulse laser sections.

According to the laser source of this embodiment, the intervals between pulse light beams sequentially emitted from different pulse laser sections are made equal. With this operation, when the laser source is used for an exposure unit, the exposure time can be made almost proportional to the exposure amount.

In addition, according to this embodiment, exposure amount control can be facilitated by using the above proportional relationship.

Eighth Embodiment

A laser source of the present invention will be described in detail below.

In the present invention, with the use of a single etalon, the oscillation wavelengths of laser beams emitted from a plurality of laser elements are made to coincide with each other within a predetermined wavelength range. This method will be described first.

The oscillation wavelength spectrum of a laser is determined by the gain spectrum of a laser medium and the resonance characteristic of a laser resonator.

For example, in a solid-state laser such as an Nd: YAG for emitting light having a wavelength of 1,064 nm, the gain spectrum of the laser medium has a spectral width of about 0.4 nm. In addition, resonance of the laser resonator exhibits a periodic form on the wavelength spectrum. Letting λ be the wavelength, and 2L be the round-trip distance inside the resonator, then resonance wavelengths are present at the wavelength separations given by $$\Delta\lambda = \lambda^2/2L \qquad (3)$$

Each of these wavelengths is called a longitudinal mode. For example, if the length of the laser resonator is given by L=0.1 m, the longitudinal mode wavelength separation Δλ is 5.7 pm.

If, therefore, the laser is oscillated in this state, a plurality of longitudinal modes are present, in the oscillation wavelength of the laser, at spacings Δλ=5.7 pm within a gain width of about 0.4 nm.

As a technique of extracting a specific longitudinal mode from these modes, a technique of inserting an etalon is available. An etalon is a kind of resonator having two parallel reflecting surfaces. Etalons are classified into two types, i.e., one having two glass plates spaced apart from each other, and the other having one glass plate whose two surfaces are formed as reflecting surfaces.

This embodiment uses an etalon having a glass plate whose two surfaces are formed as reflecting surfaces. As is apparent, however, an etalon constituted by two glass plates may be used. Furthermore, an optical element other than an etalon may be used as long as the element can transmit only light in a desired wavelength range, the light-transmitting portions can be inserted in a plurality of laser elements, and the element is integrally supported such that the respective portions are interlocked with each other. For example, separate etalon portions may be formed on one substrate at positions corresponding to the optical paths of the respective laser elements.

The function of an etalon is described in detail in Walter Koechner, "Solid-State Laser Engineering", 3rd Edition, Springer Series in Optical Sciences, Vol. 1, Springer-Verlag, ISBN 0-387-53756-2, pp. 225–238.

The etalon serves as a wavelength selection filter having a transmittance represented by a mountain-like characteristic curve having a width Δλetalon and a peak corresponding to a central wavelength λetalon. In the present invention, therefore, the thickness of the etalon and the reflecting mirrors of the two surfaces of the etalon are adjusted such that the wavelength Δλetalon becomes almost equal to the above longitudinal mode spacing Δλ. With this adjustment, the etalon transmits a mode of the above longitudinal modes having a wavelength closest to the wavelength λetalon, but does not transmit the remaining modes.

The central wavelength λetalon of the etalon is determined by the thickness of the etalon and the inclination of the etalon with respect to transmitted light. That is, the central wavelength λetalon should satisfy the following equation:

$$2nd\ \cos\Theta = m\lambda\text{etalon} \qquad (4)$$

where n is the reflectance inside the two reflecting surface of the etalon, d is the distance between the two reflecting surfaces (thickness of the etalon), $\Theta$ is the angle at which the input light beam is incident on the etalon, and m is an arbitrary integer not less than 1.

If the above values n, d, and $\Theta$ of etalons are not made uniform when they are inserted in a plurality of laser elements, the oscillation wavelengths of the respective laser elements vary.

In the present invention, therefore, in order to make the oscillation wavelengths of a bundle of a plurality of laser elements coincide with each other, one plane-parallel etalon having a uniform refractive index is inserted in a plurality of laser elements. This structure is equivalent to a structure in which etalons having the same refractive index, the same thickness, and the same inclination are inserted in all laser elements.

According to the present invention, in all the laser elements, one longitudinal mode is selected, and the wavelengths of the selected longitudinal modes are made uniform near the central wavelength $\lambda$etalon. In addition, the maximum offset of the oscillation wavelength $\lambda$ from the central wavelength $\lambda$etalon is $\Delta\lambda/2$.

In the present invention, a laser beam emitted from a solid-state laser can be used as a fundamental wave, and the fundamental wave can be converted into a fifth harmonic by using a nonlinear crystal. In this case, a wavelength offset caused in the fundamental wave is reduced to ⅕ in the fifth harmonic.

When etalons are respectively inserted in the laser elements without using the method of the present invention, it is difficult to make the refractive indexes and thicknesses of the respective etalons coincide with each other. In the present invention, however, this difficulty is overcome.

An ultraviolet laser source suitably used as a light source for an exposure unit according to still another embodiment of the present invention will be described next with reference to FIG. 14.

Figure 14:
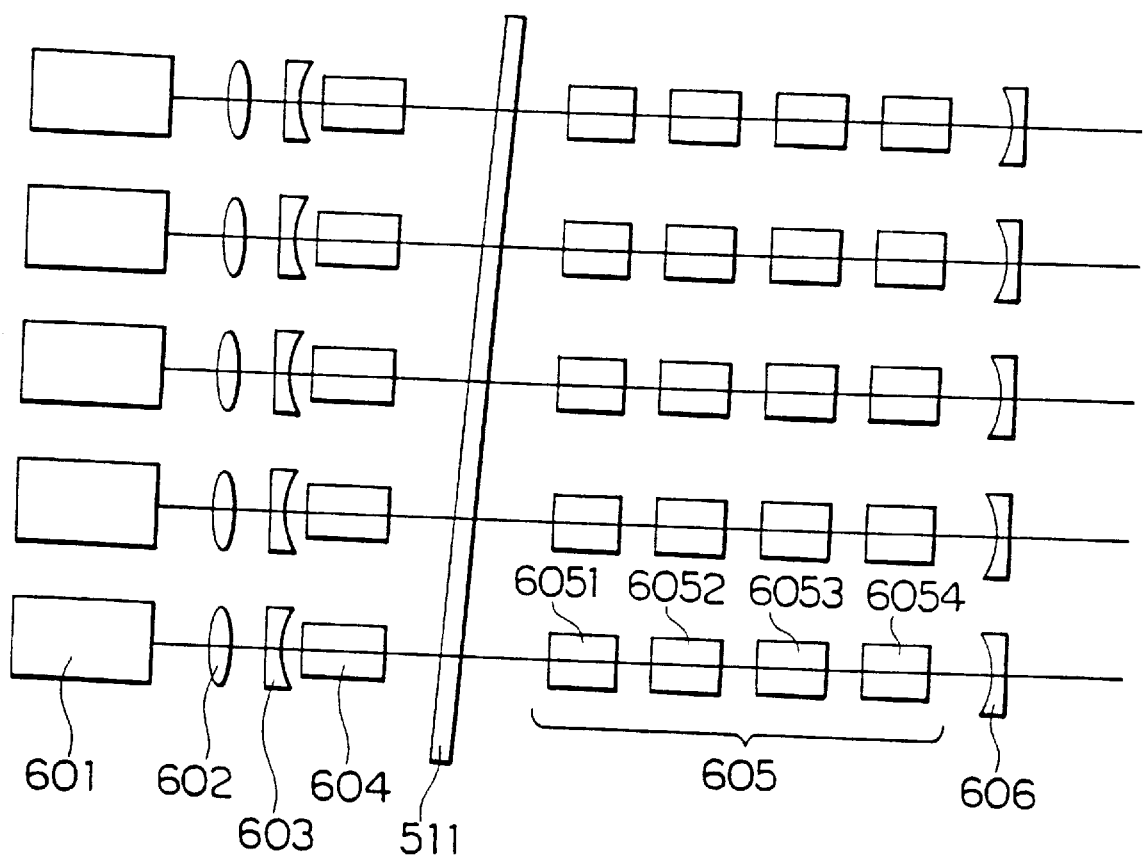
FIGS. 14 and 15 are drawings showing an ultraviolet laser source according to an eighth embodiment of the present invention.

As partly shown in FIG. 14, the ultraviolet laser source of this embodiment includes a plurality of laser elements arranged parallel to each other, and a single etalon 511 inserted in the laser elements. For the sake of descriptive convenience, FIG. 14 shows only five laser elements. However, for example, an actual apparatus is constituted by a 10 (rows)×10 (columns) laser elements, i.e., 100 laser elements.

Each laser element is constituted by a laser resonator including a pumping semiconductor laser 601, a lens 602 for focusing pumping light from the semiconductor laser 601, and a nonlinear crystal for wavelength conversion, which generates ultraviolet light in accordance with incidence of the focused pumping light.

The laser resonator includes a reflecting mirror 603, an Nd-doped YAG crystal (Nd: YAG) 604, a wavelength converting section 605, and a reflecting mirror 606. For example, the length of the laser resonator is 10 cm. In this case, therefore, $\Delta\lambda$ is about 5.7 pm.

If the pumping light has a wavelength of 808 nm, the reflecting mirror 603 transmits light having a wavelength near 808 nm, which is the wavelength of the pumping light, but serves as a reflecting mirror with respect to 1,064-nm light. The reflecting mirror 606 serves as a reflecting mirror with respect to light having a wavelength near 1,064 nm, but transmits light having other wavelengths.

The Nd-doped YAG crystal (Nd: YAG) 604 serves as a laser medium for oscillating light having a wavelength of 1,064 nm. In the laser resonator, this 1,064-nm light reciprocates in a resonant state.

For example, the wavelength converting section 605 is constituted by $LiB_3O_5$ (LBO) members 6051, 6052, and 6053 and a $\beta$-$BaB_2O_4$ (BBO) member 6054 arranged in cascade. The respective nonlinear optical crystals sequentially convert the 1,064-nm light into 532-nm light, 355-nm light, 266-nm light, and 213-nm light, respectively. These light beams are transmitted through the reflecting mirror 606 to be output. Of these light beams, the 213-nm light beam is used for exposure.

Note that each of the remaining laser elements (including those not shown in FIG. 14) having no reference numerals has the same structure as that described above.

In this embodiment, the single plane-parallel etalon 511 is inserted between the Nd: YAGs 604 and the wavelength converting sections 605 in the resonators of the plurality of laser elements each having the above structure.

Assume that all the laser elements are arranged in advance such that the optical axis directions become parallel to each other in the optical paths at portions where the etalon 511 is inserted.

For example, the etalon has a thickness of 0.1 cm, and the central wavelength $\lambda$etalon is set near the maximum gain of the Nd: YAG crystal by adjusting the inclination with respect to the overall laser elements arranged parallel to each other.

According to this embodiment, the above structure is equivalent to a structure in which etalons having the same central wavelength $\lambda$etalon are inserted in the respective laser elements, and only one longitudinal mode near the central wavelength $\lambda$etalon is oscillated. As a result, the oscillation wavelengths of the respective laser elements fall within a predetermined range near the central wavelength $\lambda$etalon.

In this embodiment, the offset of the oscillation wavelength of each laser element from the central wavelength $\lambda$etalon is $\Delta\lambda/2=2.8$ pm in the fundamental wave, but the offset is reduced to ⅕, i.e., 0.53 pm, in the 213-nm fifth harmonic.

In this embodiment, the laser is continuously oscillated. However, the present invention can be applied to a case wherein pulse oscillation is performed by a technique of placing a Q-switch in the resonator, with an arrangement similar to the above one.

In this embodiment, the etalon 511 is placed between the laser medium 604 and the wavelength converting section 605. However, for example, the etalon 511 may be placed between the reflecting mirror 603 and the laser medium 604.

An ultraviolet laser source suitably used as a light source for an exposure unit according to still another embodiment of the present invention will be described next with reference to FIG. 15.

Figure 15:
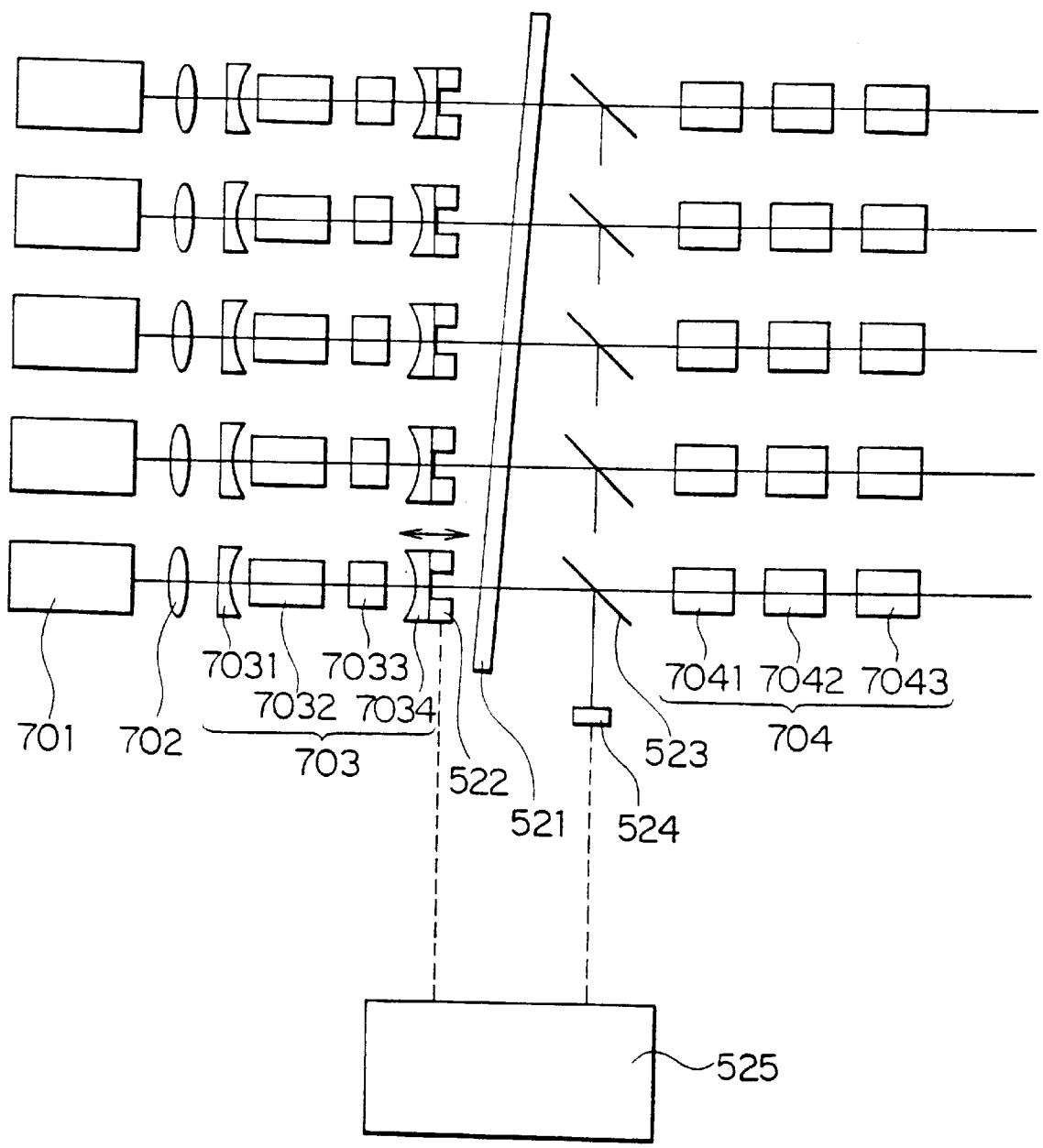

Similar to FIG. 14, FIG. 15 shows only five laser elements, for the sake of descriptive convenience. However, the number of laser elements to be included in an actual light source is not limited to five. For example, a light source is constituted by 10 (rows)×10 (columns) laser elements, i.e., a total of 100 laser elements.

As shown in FIG. 15, the ultraviolet laser source of this embodiment includes a plurality of parallel laser elements and designed to emit pulse laser beams, and a single etalon 521 inserted for all the laser elements.

Each laser element includes a pumping semiconductor laser 701, a lens 702 for focusing pumping light from the semiconductor laser 701, a pulse laser 703 for emitting a pulse laser beam upon incidence of the focused pumping light, and a wavelength converting section 704 for wavelength-converting the emitted pulse laser beam into ultraviolet light.

In this embodiment, the single plane-parallel etalon 521 is inserted in the optical paths between the pulse lasers 703 and the wavelength converting sections 704 of the plurality of laser elements each having the above structure.

The ultraviolet laser source of this embodiment further includes a structure for adjusting the wavelength of a laser beam emitted from each pulse laser 703. This structure includes piezo-actuators 522 provided for the respective laser elements to change the resonator lengths of the pulse lasers 703, semi-transparent mirrors 523 for extracting components of laser beams having passed through the etalon 521, a photodetector 524 for detecting the amount of light polarized by each semitransparent mirror 523, and a feedback circuit 525 for driving each piezo-actuator 522 in accordance with the light amount detected by the photodetector 524.

The pulse laser 703 is constituted by a reflecting mirror 7031, a laser medium 7032, an acousto-optic modulation element 7033, and a reflecting mirror 7034. This embodiment exemplifies a Q-switched laser using an Nd: YAG crystal as the laser medium 7032. In this pulse laser 703, a laser beam, which can be actually oscillated in a wavelength band assumed in this embodiment, is made to have a single longitudinal mode by using, e.g., a method of decreasing the resonator length. Note that the wavelength of this laser beam can be changed by moving the reflecting mirror 7034 using the piezo-actuator 522.

Light emitted from the pulse laser 703 passes through the etalon 521. For example, the thickness of the etalon 521 is 0.1 cm.

The light having passed through the etalon 521 is partly reflected by the semi-transparent mirror 523 to be incident on the photodetector 524. The amount or intensity of the light received by the photodetector 524 is converted into an electrical signal proportional to the light amount or intensity. The signal is then input to the feedback circuit 525. The feedback circuit 525 sends the signal to the piezo-actuator 522 to change the position of the reflecting mirror 7034, thereby adjusting the oscillation wavelength of the pulse laser beam.

As the oscillation wavelength of the pulse laser approaches the central wavelength of the etalon 521, the amount of light received by the photodetector 524 increases. The oscillation wavelength is adjusted by performing a feedback operation with respect to the piezo-actuator 522 to maximize the light amount. As a method of detecting the maximum value, the following method can be used. In this method, for example, the piezo-actuator 522 is finely vibrated, and the maximum value is obtained when the detection signal from the photodetector 524 does not indicate light intensity modulation corresponding to the frequency of the fine vibration.

Although not shown in FIG. 15, the photodetector 524 and the feedback circuit 525 are connected to the remaining laser elements (including those that are not shown).

According to this embodiment, since the wavelengths of light beam emitted of all the laser elements can be adjusted with reference to the central wavelength of the etalon 521 having the same thickness and inclination, the wavelengths of laser beams emitted from the respective laser beams coincide with each other. Note that a coincidence error is determined by a feedback error in the above wavelength adjustment processing.

The fundamental wave (wavelength: 1,064 nm) obtained by the wavelengths is adjusted and made uniform with the above structure, is sequentially converted into 532-nm light, 266-nm light, and 213-nm light by the wavelength converting section 704 constituted by an LBO member 7041 and BBO members 7042 and 7043 arranged in cascade. The resultant light beams are output. Of these light beams, the 213-nm light beam is used for exposure.

According to this embodiment, since the wavelength of the fundamental wave is uniform for all the laser elements, the wavelength of the fifth harmonic (wavelength: 213 nm) is made uniform.

In this embodiment, the wavelength of an oscillated laser beam is controlled by changing the length of the pulse laser resonator. However, the present invention is not limited to this wavelength control method. Other wavelength control methods may be used as long as a wavelength can be changed by using the above feedback operation. For example, the equivalent resonator length may be changed by electrically changing the refractive index by inserting an electro-optic element in each laser resonator. Alternatively, wavelength control may be performed by using an electro-optic element obtained by attaching an electrode to a wavelength converting crystal.

In this embodiment, the etalon 521 is inserted between the pulse lasers 703 an the wavelength converting sections 704. However, similar to the embodiment shown in FIG. 14, the etalon 521 may be inserted in the pulse lasers 703. When the etalon 521 is inserted in each pulse laser 703, the etalon may be inserted between any members constituting the pulse laser 703.

Ninth Embodiment

The ninth embodiment of the present invention will be described in detail next with reference to the accompanying drawings.

A laser source in the ultraviolet region according to the ninth embodiment of the present invention will be described with reference to FIGS. 16 and 17.

Figure 16:
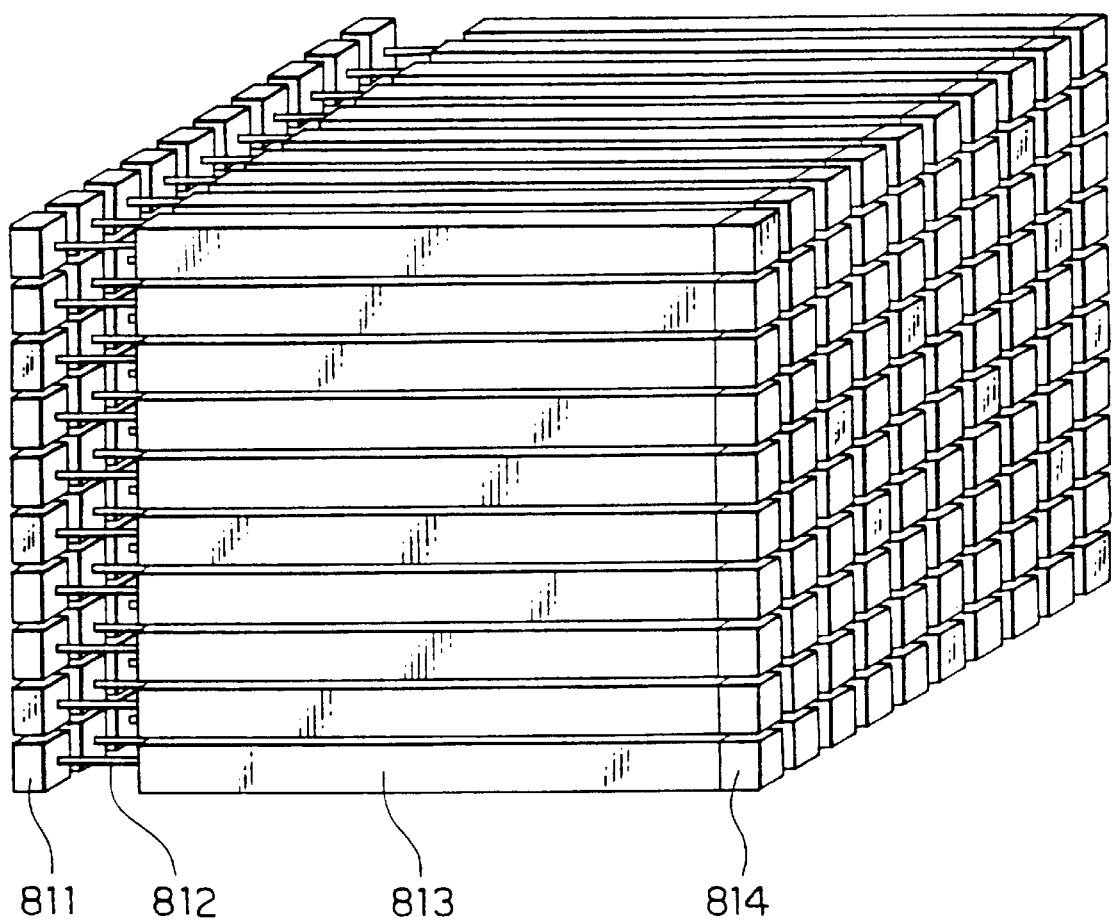
FIGS. 16 and 17 are drawings showing an ultraviolet laser source according to the ninth embodiment of the present invention.

As shown in FIG. 16, the ultraviolet laser source of this embodiment is constituted by 10×10 laser elements, i.e., a total of 100 laser elements. Each laser element includes a semiconductor laser 811 for emitting pumping light, an optical fiber 812 for transferring the pumping light, a solid-state laser 813 having nonlinear crystals incorporated in a resonator, and an optical element 814 on the exit end of the solid-state laser 813.

Each laser element, excluding the semiconductor laser 811, has a cross-sectional area of about 5 mm×5 mm. This embodiment uses a combination of 100 laser elements. However, the number of laser elements is not limited to 100. The present invention has been made on the premise that 2 to about 1,000 laser elements are used.

The semiconductor laser 811 for emitting pumping light emits light for pumping the solid-state laser 813. The light emitted from the semiconductor laser 811 is incident on the optical fiber 812 to be guided to the solid-state laser 813. Instead of the method of using the optical fiber 812, the pumping light may be focused by a lens and guided to the solid-state laser 813.

When the light from the semiconductor laser 811 enters the solid-state laser 813, the respective laser elements in the solid-state lasers 813 are pumped. A laser beam having a desired wavelength is emitted from the exit end of each solid-state laser 813.

The laser beam emitted from the solid-state laser 813 is caused to diverge by the optical element 814 mounted on the exit end-of the solid-state laser 813 to be uniformly irradiated on an illumination surface.

With this structure, since a plurality of laser elements are bundled, light outputs add up to a high output. In addition, since light beams are output from the independent laser elements, the temporal and spatial coherences can be decreased. Furthermore, since the optical elements are mounted on the exit ends of the solid-state lasers 813 of the respective laser elements, light beams emitted from the laser elements can be uniformly irradiated on the illumination surface in a superimposed state.

Since the laser elements are used in a bundled state, the output of each laser element need not be increased. The load on each solid-state laser 813 can therefore be reduced, and the service life of the apparatus can be prolonged.

In the ninth embodiment of the present invention, the band of wavelengths of light beams emitted from the respective laser elements can be narrowed to a band sufficiently smaller than 1 pm. The differences in wavelength between light beams emitted from the respective laser elements can be set to 1 pm or less by adjusting the structure of each laser element, i.e., changing the laser medium and the length of the laser resonator and using a wavelength selection optical system such as a band-pass filter.

In the ninth embodiment of the present invention, pumping light is obtained from the semiconductor laser 811. The solid-state laser 813 is constituted by a laser medium 932, nonlinear crystals 933, 934, 935, and 936 for performing wavelength conversion of the light emitted from the laser medium 932, and laser resonance mirrors 931 and 937 for forming a laser resonator containing the above components from the laser medium 932 to the nonlinear crystal 936.

This laser source is constituted by 10 (rows)×10 (columns) laser elements, i.e., a total of 100 laser elements, as shown in FIG. 16. Each laser element includes a semiconductor laser 811 for emitting pumping light, an optical fiber 812 for transferring the pumping light, and nonlinear crystals incorporated in the resonator cavities.

An ultraviolet light output of about 100 mW (0.1 W) is expected from each laser element, and hence an output of about 10 W is expected from the overall light source of this embodiment.

Each laser element is cooled by a cooling mechanism (not shown). For example, a cooling mechanism is designed such that each laser element is buried in a copper block, and the copper block is cooled by a cooler.

As the semiconductor laser 811, a laser having an oscillation wavelength of 808 nm, and an output of about 10 W at the outlet of the optical fiber 812 is used. The pumping light from the semiconductor laser 811 is guided to the laser resonator (constituted by the components 931 to 937) of the solid-state laser 813 through the optical fiber 812. The light incident on the solid-state laser 813 pumps the laser medium 932 through the laser resonance mirror 931.

The solid-state laser 813 emits continuous ultraviolet light having a wavelength of 213 nm to the right. The solid-state laser 813 has the laser medium 932 and the four nonlinear crystals 933, 934, 935, and 936 for wavelength conversion in the resonator, and includes the laser resonance mirrors 931 and 937.

As the laser medium 932 in this embodiment, a laser having an Nd-doped yttrium aluminum garnet (Nd: YAG) as a laser medium and emits 1,064-nm light is used.

As the laser resonance mirror 931, a mirror exhibiting a high transmittance with respect to the 808-nm pumping light, and a high reflectance with respect to the 1,064-nm fundamental wave from the solid-state laser is used. This laser resonance mirror 931 need not be used as a discrete part, and a reflecting film may be deposited on the left end face of the laser medium 932.to substitute for the mirror 931.

The 1,064-nm fundamental wave (frequency $\omega$) emitted from the laser medium 932 is transmitted through the nonlinear crystals 933, 934, 935, and 936 and reciprocates in the laser resonator formed between the laser resonance mirrors 931 and 937.

When the light of this fundamental wave reciprocates in this laser resonator, the fundamental wave loses its energy due to reflection and scattering on the end face of each nonlinear crystal, absorption therein, conversion of energy into harmonics, and the like. However, the light is amplified when it passes through the laser medium 932. As a result, the intensity of the fundamental wave in the resonator increases to several ten watts to several hundred watts.

Figure 17:
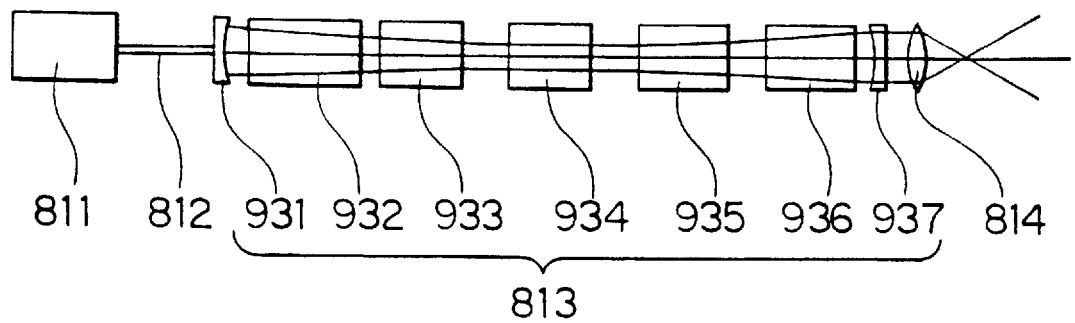

Referring to FIG. 17, when the fundamental wave emitted from the laser medium 932 passes through the nonlinear crystal 933 from left to right, a second harmonic having a wavelength of 532 nm (frequency $2\omega$) is generated (second harmonic generation; $\omega+\omega=2\omega$). As the nonlinear crystal 933, $LiB_3O_5$ (LBO) is used. Although part of the energy of the fundamental wave is lost upon conversion, the absolute intensity of the wave is still high, and the high intensity can be maintained. In this case, the cutting direction of an end face of the nonlinear crystal 933 is determined in accordance with the polarizing direction of the incident light to attain type I phase matching. In type I phase matching, a second harmonic polarized in the horizontal direction is generated from the fundamental wave polarized in the vertical direction.

The 532-nm second harmonic generated by the nonlinear crystal 933 propagates to the next nonlinear crystal (LBO) 934, together with the 1,064-nm fundamental wave. Sum frequency generation ($\omega+2\omega=3\omega$) of the second harmonic and the fundamental wave is performed to generate a third harmonic (wavelength: 355 nm). At this time, although the intensities of the second harmonic and the fundamental wave slightly decrease, the high intensity of the fundamental wave is still maintained. In this case, an end face of the nonlinear crystal 934 is cut to perform so-called type II phase matching. In type II phase matching, a third harmonic having a vertical component is generated from the fundamental wave in the vertical direction and the second harmonic in the horizontal direction.

At least the light components of the fundamental wave and the third harmonic reach the next nonlinear crystal (LBO) 935. In this nonlinear crystal (LBO) 935, sum frequency generation ($\omega+3\omega=4\omega$) of the fundamental wave and the third harmonic is performed to generate a fourth harmonic having a wavelength of 266 nm. In this case, type I phase matching is performed, and the fourth harmonic is polarized in the horizontal direction.

At least the light components of the fundamental wave and the fourth harmonic reach the next nonlinear crystal (BBO) 936. In the nonlinear crystal 936, type II phase matching is performed to perform sum frequency generation ($\omega+4\omega=5\omega$) of the fundamental wave and the fourth harmonic to generate a fifth harmonic (wavelength: 213 nm). As the nonlinear crystal 936, $\beta$-$BaB_2O_4$ (to be referred to as BBO hereinafter) is used. At the exit of the nonlinear crystal (BBO) 936, the intensity of the fundamental wave is still high. An output of about 100 mW can be expected from the generated fifth harmonic.

The laser resonance mirror 937 having wavelength selectivity is mounted on the exit end side of the solid-state laser 813 (laser resonator). This laser resonance mirror 937 reflects the light of the fundamental wave to direct it toward the laser resonance mirror 931 again. On the other hand, the laser resonance mirror 937 transmits the fifth harmonic generated by the solid-state laser 813. Note that since the intensities of the second, third, and fourth harmonics have decreased, they may be transmitted or reflected.

As nonlinear crystals, $KBe_2BO_3F_2$ (KBBF) and $Sr_2Be_2B_2O_7$ (SBBO) can be used. By using these crystals, ultraviolet light having shorter wavelengths may be generated.

In consideration of the application of the laser source to a semiconductor manufacturing apparatus, the following two conditions are required: the line width of the oscillation wavelength of each laser element must be 1 pm or less, and the differences in wavelength between the laser elements must be 1 pm or less.

In this embodiment, in such a case, wavelength control can be performed to satisfy the above two conditions in the following manner.

Each laser element is adjusted to oscillate in only one longitudinal mode of several longitudinal modes (corresponding to oscillation wavelengths). For this purpose, the resonator length is adjusted, and an optical element having wavelength selectivity is inserted therein, as needed.

The oscillation line width of one longitudinal mode is typically 0.01 pm or less. If, therefore, oscillation is performed in a given longitudinal mode (Single frequency operation), the oscillation line width of each laser element becomes 1 pm or less, which is required.

The natural wavelength of a longitudinal mode occurs periodically, and a wavelength separation $\Delta\lambda$ is given by:

$$\Delta\lambda = \lambda^2/(2L \cdot n) \quad (5)$$

where 2L is the round-trip distance inside the laser resonator, n is the refractive index of the material inside the resonator, and $\lambda$ is the oscillation wavelength.

In this embodiment, L=11.5 cm, a fundamental wave having a wavelength of 1,064 nm is used for the Nd: YAG, and 1.7 as the average refractive index of the Nd: YAG and the nonlinear crystal is used as n. In this case, the wavelength separation $\Delta\lambda$ is 2.9 pm. With the 213-nm fifth harmonic of this fundamental wave, the wavelength separation $\Delta\lambda$ is 0.6 pm.

In general, when one longitudinal mode is oscillated, a longitudinal mode having a wavelength exhibiting the maximum gain of the laser medium is oscillated. This wavelength is determined by the laser medium used. The wavelengths oscillated by a plurality of laser elements fall near the natural frequency of the laser medium. More specifically, the maximum difference in wavelength between the laser elements, with respect to the wavelength exhibiting the maximum gain of the solid laser medium, is only ½ the longitudinal mode spacing (in the above case, only ±0.6 pm/2=±0.3 pm).

If the resonator length L is smaller than the above value, since the mode spacing $\Delta\lambda$ increases, the oscillation wavelengths can be matched by adjusting the resonator length L of each laser element or the characteristics of each wavelength selection element.

In this embodiment, since light beams are emitted from a plurality of laser elements, the spatial coherence is low.

In this embodiment, since the spatial coherence is decreased in the above manner, speckles can be more effectively reduced than in the prior art in which a solid-state laser emits one beam.

In this embodiment, anti-reflection films are formed on the end faces of the laser medium 932 and the nonlinear crystals 933, 934, 935, and 936 disposed in the solid-state laser 813. Instead of forming the anti-reflection films, the respective optical parts may be disposed in tight contact with each other (bonding or optical contact) to prevent reflection. Alternatively, similar to the laser resonance mirror 931, the laser resonance mirror 937 may not be a discrete part, and a reflecting film deposited on the end face of the nonlinear crystal 936 may be used as a reflecting surface to substitute for the laser resonance mirror 937.

A convex lens as the optical element 814 is mounted on the exit end of the solid-state laser 813. Light emitted from the solid-state laser 813 is focused by this convex lens 814 to form one point light source. The light diverges again from the formed point light source to be irradiated on an entire illumination surface with an almost uniform light intensity. In addition, light beams emitted from other lasers can also be irradiated on the illumination surface with an almost uniform intensity. As a result, the light beams emitted from the respective lasers are uniformly irradiated on the entire illumination surface in a superimposed state. As described above, light beams emitted from all the laser elements can be uniformly irradiated on the illumination surface.

When the light source is applied to a general semiconductor exposure apparatus, in particular, the optical element 814 exhibits a special effect. In order to improve the quality of an image formed on a wafer, it is preferable that light beams emitted from all the laser elements be uniformly irradiated on a mask pattern as an illumination surface.

In order to uniformly irradiate light beams from the respective laser elements onto the illumination surface, the optical element 814 is mounted on the exit side of the solid-state laser 813. By mounting the optical elements 814 on the exit sides of a plurality of laser elements, light beams from the respective laser elements can be uniformly irradiated on the illumination source, and the light beams from the laser elements can be uniformly irradiated in a superimposed state.

By mounting these optical elements on the exit sides of the respective laser elements, a better illumination optical device can be provided as a device for optically transferring a fine pattern.

In this embodiment, harmonics and fundamental wave components other than the fifth harmonic are also output through the laser resonance mirror 937, even though they have low intensities. If these components are expected to adversely affect exposure, a filter may be disposed outside the laser to remove them.

If these laser elements do not oscillate in a single longitudinal mode, wavelength selection elements may be added.

According to this embodiment, there is provided an ultraviolet laser source which emits ultraviolet light having a wavelength of 213 nm, has a total output of about 10 W and a spectral line width of 1 pm or less, inflicts little damage to each nonlinear crystal, and exhibits low spatial coherence.

Tenth Embodiment

The 10th embodiment of the present invention will be described next.

Figure 18:
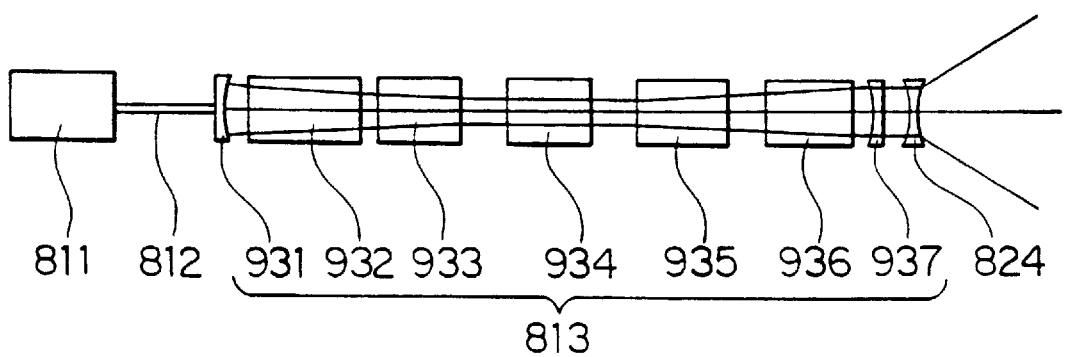
FIG. 18 is a drawing showing an ultraviolet laser source according to the tenth embodiment of the present invention.

FIG. 18 schematically shows the structure of the 10th embodiment of the present invention. Since the same reference numerals in FIG. 18 denote the same parts as in FIG. 17, a description thereof will be omitted. The 10th embodiment is different from the ninth embodiment in that a concave lens 824 is disposed in place of the optical element 814. Even if the concave lens 824 is disposed in place of the optical element 814 in this manner, since light emitted from a solid-state laser 813 diverges, the light can be irradiated on an entire illumination surface with an almost uniform light intensity. When the concave lens 824 is disposed, a convergence point whose role is similar to a point light source formed when the optical element 814 is disposed is virtually formed on the solid-state laser side. Since the illumination surface should be located at a position where light emitted from this point light source can be irradiated on the entire illumination surface, if such a concave lens is disposed on the exit end side of each laser element, the distance from each laser element to the illumination surface can be shortened as compared with the case of the convex lens. Therefore, with such a laser source, the exposure unit can be made more compact.

Eleventh Embodiment

The 11th embodiment of the present invention will be described next.

Figure 19:
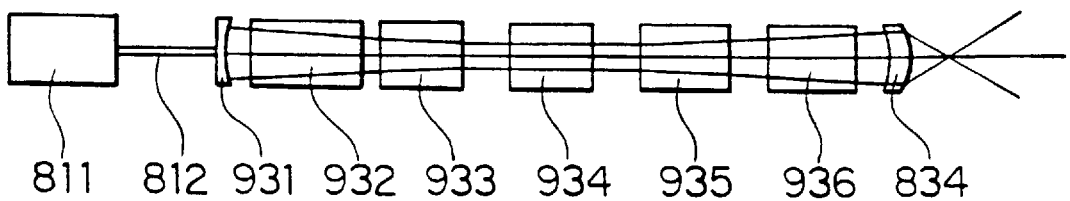
FIG. 19 is a drawing showing an ultraviolet laser source according to an eleventh embodiment of the present invention.

FIG. 19 schematically shows the structure of the 11th embodiment of the present invention. Since the same reference numerals in FIG. 19 denote the same parts as in FIG. 17, a description thereof will be omitted. The 11th embodiment is different from the ninth embodiment in that a transparent substrate having a desired curvature is formed on the opposite side of a laser resonance mirror 834 to the mirror surface instead of the optical element 814.

Note that the laser resonance mirror disposed on the laser beam exit side is obtained by forming a plurality of films made of materials for reflecting light of a fundamental wave, as a multilayered film, on a transparent substrate, which transmits a fifth harmonic as light having a wavelength of 213 nm. In general, as a laser resonance mirror, a mirror obtained by forming a multilayered film serving as a mirror on a transparent substrate is used. The 11th embodiment of the present invention has been made in consideration of the difference in refractive index between this transparent substrate and air. In addition, a desired curvature is given to the substrate to make it serve as a kind of lens.

In the 11th embodiment of the present invention, a relatively thick substrate is used for a laser resonance mirror, and the opposite surface of the laser resonance mirror to the reflecting surface is made to have a curvature so as to have the same function as that of the convex lens 814 in the ninth embodiment of the present invention, thereby making the resultant component serve both as a laser resonance mirror and an optical element disposed on the laser beam exist end side. With this structure, similar to the ninth embodiment of the present invention, light emitted from a solid-state laser 813 and having passed through the laser resonance mirror 834 is focused to form one point light source. The light diverges again from the formed point light source to be irradiated on the entire illumination surface with an almost uniform intensity. With this operation, the same effects as those of the ninth embodiment of the present invention can be obtained.

The opposite surface of the laser resonance mirror 834 to the reflecting surface may have the same curvature as that of a concave lens. In this case, the same effects as those of the 10th embodiment of the present invention can be obtained.

Twelfth Embodiment

The 12th embodiment of the present invention will be described next.

Figure 20:
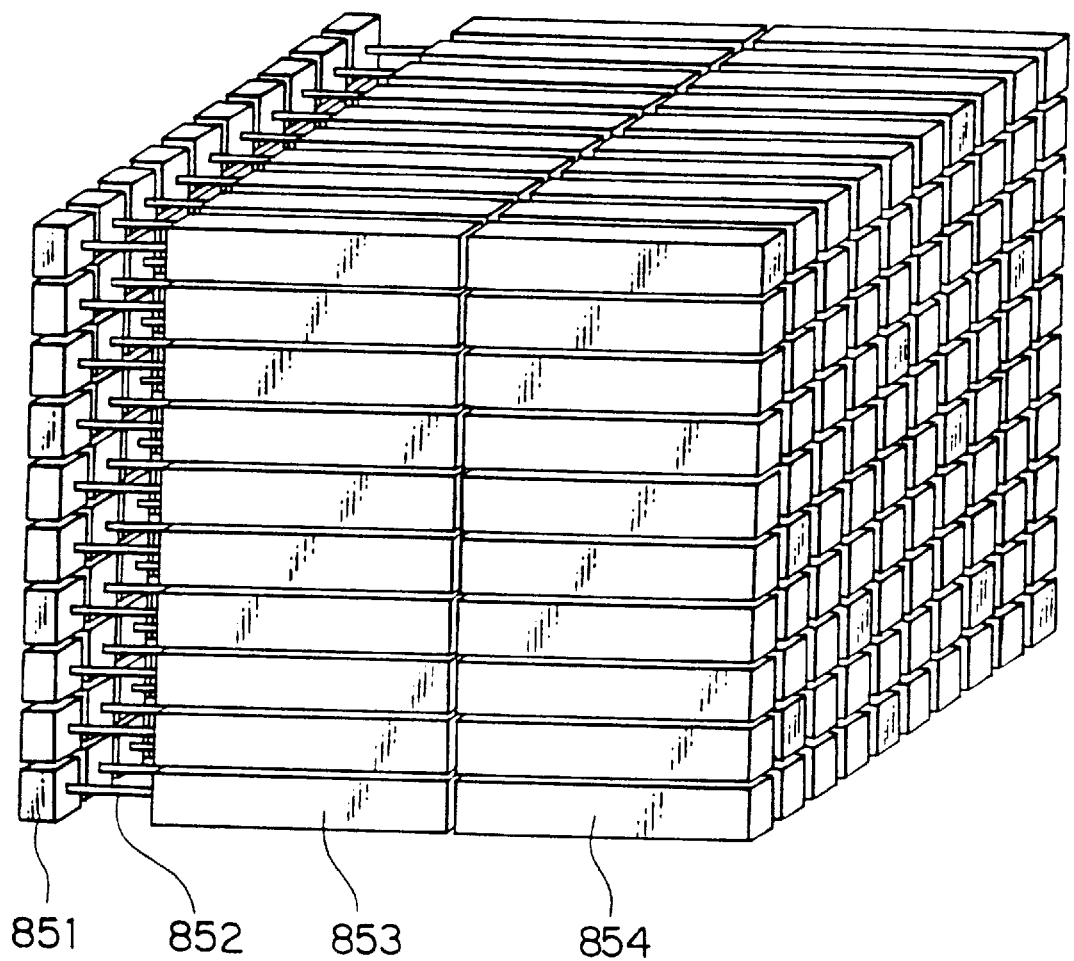
FIGS. 20 and 21 are drawings showing an ultraviolet laser source according to the twelfth embodiment of the present invention.

FIG. 20 shows the outer appearance of the 12th embodiment of the present invention. Note that the 13th embodiment of the present invention, which will be described later, has the same outer appearance as that in FIG. 20.

An ultraviolet laser source of the 12th embodiment is constituted by a bundle of a plurality of laser elements arranged parallel to each other, similar to the structure shown in FIG. 16. Each laser element has an optical structure like the one shown in FIG. 21.

More specifically, each laser element includes a semiconductor laser 851 for emitting pumping light, a laser resonator (solid-state laser) 853 pumped by the pumping light to emit light of a fundamental wave, and a wavelength converting section 854 for converting the light emitted from the laser resonator 853 into light of a fifth harmonic. Each laser element finally outputs ultraviolet light having a wavelength of 213 nm. Similar to the ninth embodiment of the present invention, the laser resonator 853 and the wavelength converting section 854 are respectively sealed in copper blocks (not shown), and a cooling mechanism (not shown) is used.

In the 12th embodiment of the present invention, as the semiconductor laser 851, the same semiconductor laser as that used in the ninth embodiment is used. An optical fiber 852 is also used for the same purpose as that in the ninth embodiment.

The laser resonator 853 includes laser resonance mirrors 8531 and 8534, a laser medium 8532, and a Q switch 8533. The wavelength converting section 854 has nonlinear crystals 8541, 8542, and 8543 for wavelength conversion. A curved surface is formed on the light exit end of the nonlinear crystal 8543.

Pumping light having a wavelength of 808 nm (output: 3 W) from the semiconductor laser 851 is guided to the laser resonator 853 through the optical fiber 852. The light is transmitted through the laser resonance mirror 8531 to be incident on the laser medium 8532. In this case, a condenser lens may be disposed between the semiconductor laser 851 and the laser resonator 853 to focus the light from the semiconductor laser and guide it to the laser resonator 853, instead of using the optical fiber to input the light from the semiconductor laser to the laser medium 8532.

The laser resonator 853 will be described next. Unlike in the ninth embodiment of the present invention, the laser resonator 853 has a pulse laser structure based on the known Q-switching method.

The laser resonator 853 has the laser medium 8532 and the modulator 8533 between the laser resonance mirrors 8531 and 8534.

The light guided to the laser resonator 853 is transmitted through the laser resonance mirror 8531 to pump the Nd: YAG crystal 8532 as the laser medium.

The laser resonator 853 incorporates the modulator 8533 based on an acousto-optic effect, and can generate the 1,064-nm light emitted from the laser medium 8532 as pulse light by the so-called Q-switching method. The pulse width of this pulse light is about 5 ns (nanosecond), the energy per pulse is about 100 µJ (microjoule), and the repeating frequency of pulses is about 10 kHz. According to this structure, the average energy output is approximately 1 W.

The pulse light output from the laser resonator 853 has a large peak output. For this reason, efficient wavelength conversion can be performed without using any resonator structure in wavelength conversion.

In the 12th embodiment of the present invention, the 1,064-nm light emitted from the laser resonator 853 is irradiated on the nonlinear crystal (LBO) 8541. The nonlinear crystal 8541 generates a second harmonic having a wavelength of 532 nm (frequency 2 ω) from the 1,064-nm light as the fundamental wave. In this case, the cutting direction of an end face of the nonlinear crystal 8541 is determined in accordance with the polarizing direction of the light emitted from the laser resonator 853 to attain type I phase matching.

Since the 12th embodiment of the present invention is the pulse laser, the peak output obtained from this laser is larger than the output obtained by the ninth embodiment. The nonlinear crystal (BBO) 8542 further generates a fourth harmonic having a wavelength of 266 nm (frequency 4ω) (fourth harmonic generation; 2ω+2ω=4ω) from the second harmonic obtained by the nonlinear crystal 8541. In this case, the cutting direction of an end face of the nonlinear crystal 8542 is determined to attain type I phase matching with respect to the light emitted from the nonlinear crystal 8541.

Finally, the nonlinear crystal (BBO) 8543 performs sum frequency generation of the fundamental wave from the laser resonator 853 and the fourth harmonic from the nonlinear crystal 8542 to generate 213-nm ultraviolet light as a fifth harmonic. At this time, since the light emerging from the nonlinear crystal 8542 has passed through the two nonlinear crystals, the light has the same plane of polarization as that of the fundamental wave. For this reason, the current direction of an end face of the nonlinear crystal 8543 is determined to attain type I phase matching with respect to the light emerging from the nonlinear crystal 8542 and the light emerging from the laser resonator 853.

In order to further improve the wavelength conversion efficiency in each nonlinear crystal, a laser beam may be passed through the nonlinear crystal after it is focused by a condenser lens disposed on the incident side of the nonlinear crystal.

In the 12th embodiment of the present invention, a curved surface is formed on the exit-side surface of the nonlinear crystal 8543 located closest to the exit side of each laser element. This curved surface has the same shape as that of a convex lens. Since the exit-side surface of the nonlinear crystal 8543 has the same shape as that of the convex lens as described above, light emitted from the laser element is focused once. The position where the light emerging from each laser element is focused serves as a point light source, and hence the light emerging from each laser element can illuminate the entire illumination surface from the position where the light emerging from each laser element is focused. The 12th embodiment of the present invention has been made in consideration of the difference in refractive index between the nonlinear crystal 8543 and air, and the exit-side surface of the nonlinear crystal 8543 located closest to the exit side of the laser element is formed into the same shape as that of a convex lens, thereby allowing the nonlinear crystal 8543 to have the same function as that of the convex lens. Note that the exit-side surface of the nonlinear crystal 8543 may be formed into the same shape as that of a concave lens, instead of the shape of a convex lens. If the exit-side surface of the nonlinear crystal 8543 has the same shape as that of a concave lens, the distance from each laser element to the illumination surface can be shortened, as in the 10th embodiment.

Thirteenth Embodiment

Figure 22:
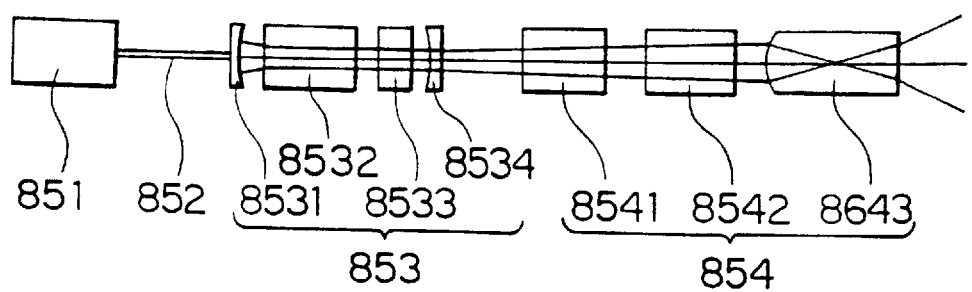
FIG. 22 is a drawing showing an ultraviolet laser source according to the thirteenth embodiment of the present invention.

The 13th embodiment of the present invention will be described next. FIG. 22 schematically shows the structure of the optical system of each laser element in the 13th embodiment of the present invention.

Similar to the structure in FIG. 16, an ultraviolet laser source of the 13th embodiment of the present invention is constituted by a bundle of a plurality of laser elements arranged parallel to each other. Each laser element has an optical structure like the one shown in FIG. 22.

Figure 21:
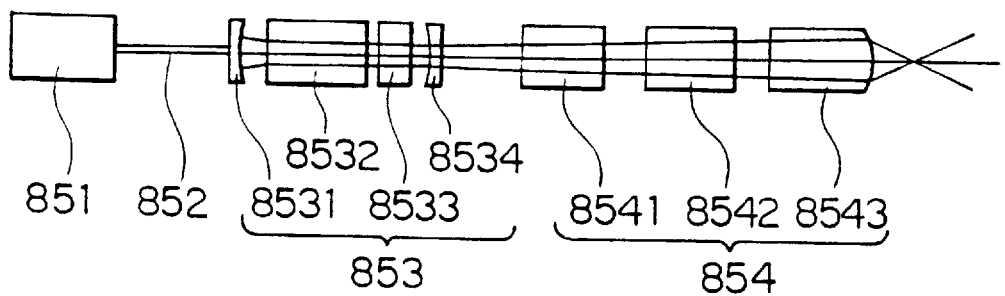

Since the same reference numerals in FIG. 22 denote the same parts as in FIG. 21, a description thereof will be omitted:

The 13th embodiment is different from the 12th embodiment in the shape of the nonlinear crystal located closest to the exit side of each laser element.

In the 13th embodiment of the present invention, light beams emerging from the respective laser components are identical. In the 13th embodiment, a curved surface is formed on the incident-side surface of a nonlinear crystal (BBO) 8643 located closest to the exit side of each laser element, unlike the 12th embodiment, in which the curved surface is formed on the exit-side surface.

In the 13th embodiment, the incident-side surface of the nonlinear crystal 8643 has the same shape as that of a convex lens. With this structure, light incident on the nonlinear crystal 8643 is focused therein. When light is focused in the nonlinear crystal, the intensity of the focused light increases. As described above, in a nonlinear crystal, if the intensity of light is increased to a certain degree at which the nonlinear crystal does not break down, the efficiency of wavelength conversion of light improves. Therefore, by focusing the light in the nonlinear crystal in this manner, the wavelength conversion efficiency can be improved. In addition, at the position where the light is focused in the nonlinear crystal 8643, the same effect as that obtained when a point light source is formed can be expected. Furthermore, since the number of parts constituting each laser element can be decreased, attenuation of light can be suppressed, and a high-intensity laser beam can be irradiated.

According to the structures of the laser elements in the 12th and 13th embodiments, as a final 213-nm ultraviolet light output (average output), an output of about 100 mW can be expected. A total output of about 10 W can therefore be expected from the overall ultraviolet laser source constituted by a bundle of 10×10 laser elements, i.e., a total of 100 laser elements, each identical to the one described above.

As described above, in the 12th and 13th embodiments, there is provided an ultraviolet laser source having merits, e.g., compactness, low spatial coherence, and easy maintenance, generates pulse light, and can uniformly illuminate an illumination surface.

In the 12th and 13th embodiments of the present invention, since pulse light is used, the spectral line width is large without any modification. However, with the use of a known method called injection lock or the insertion of an etalon, the spectral line width can be decreased to 1 pm or less.

The problem of optical damages to nonlinear crystals is posed in all the structures of the 9th to 13th embodiments of the present invention. That is, a nonlinear crystal is damaged with an excessively high light intensity to result in a deterioration in conversion efficiency. On the other hand, the light intensity must be increased to improve the conversion efficiency of the nonlinear crystal, thus making the apparatus design difficult.

In the 9th to 13th embodiments of the present invention, the overall ultraviolet laser source generates a light output of several watts, but the light output is shared by several to several hundred laser elements to limit the output per laser element to a low output. With this structure, a plurality of nonlinear crystals disposed in the solid-state laser 813 are not susceptible to optical damage, allowing a long-term, stable operation.

As described above, in the 9th to 13th embodiments of the present invention, light is refracted toward the exit end of each laser element to cause the laser beam to diverge. An object of the present invention is to uniformly irradiate light from each laser element onto an illumination surface. For this reason, a laser beam may be caused to diverge by causing diffraction at the exit end of each laser element and the nonlinear crystal at the exit end, instead of causing a light beam to diverge by using the refraction of the light. In this case, practical means include a Fresnel lens having grooves formed concentrically at predetermined intervals or predetermined angles formed concentrically at predetermined intervals. Alternatively, the exit end of each laser element may be formed into a frosted glass state to cause light to diverge. In this case, since such a structure is easy to manufacture, the throughput in manufacturing such illumination units becomes high.

If each of the 9th to 13th embodiments of the present invention includes a condenser optical system for focusing light beams emitted from a plurality of point light sources onto an irradiation surface in a superimposed state, each embodiment can be used as an illumination optical unit.

In the 9th to 13th embodiments of the present invention, the high-reflectance film is formed by alternately stacking layers made of two materials having different refractive indexes and have thicknesses each corresponding to ¼ the wavelength of light (in each material). The materials include a combination of $TiO_2$ and $SiO_2$, a combination of $Ta_2O_5$ and $SiO_2$, and a combination of $HfO_2$ and $SiO_2$. The number of layers is about 30.

The anti-reflection film can be formed by the following methods. In one method, one layer made of a material (typically, $MgF_2$) having a refractive index smaller than that of a material (glass or fused quarts) for a substrate is formed on the substrate to have a thickness corresponding to ¼ the wavelength of light in the material. In another method, an $MgF_2$ layer as the first layer and a $CeF_3$ layer as the second layer are stacked such that each layer has a thickness corresponding to ¼ the wavelength of light in each material.

The ultraviolet laser source thus described can be applied to an exposure apparatus. Such an apparatus is described in, e.g., U.S. Pat. No. 5,510,892, and U.S. Pat. No. 5,510,892 which are incorporated in the present specification as a reference in association with the exposure apparatus.

From the invention thus described, it will be obvious that the invention may be varied in many ways. Such variations are not to be regarded as a departure from the spirit and scope of the invention, and all such modifications as would be obvious to one skilled in the art based on the present disclosure are within the scope of the present invention.

The basic Japanese Application Nos. 140805/1995 filed on Jun. 7, 1995, 310763/1995 filed on Nov. 29, 1995, 043019/1996 filed on Feb. 29, 1996, and 056593/1996 filed on Mar. 13, 1996, are hereby incorporated by reference.

What is claimed is:

1. An ultraviolet laser comprising:
   a bundle of a plurality of laser elements arranged parallel to each other, each of said laser elements comprising:
   a laser beam emitting section for emitting light in a wavelength range including infrared to visible regions; and
   a wavelength converting optical system for wavelength-converting the emitted light into ultraviolet light, said wavelength converting optical system comprising optical elements each comprised of a nonlinear optical crystal, said optical elements being arranged along an emission direction of a fundamental wave emitted from said laser beam emitting section.

2. A laser source according to claim 1, wherein said laser beam emitting section comprises a semiconductor laser.

3. A laser source according to claim 2, wherein said laser beam emitting section further comprises a solid-state laser, which is pumped by the light emitted from said semiconductor laser.

4. A laser source according to claim 1, wherein each of said laser elements comprises:
   a semiconductor laser; and
   a laser resonator including a laser medium, which is pumped by the light emitted from said semiconductor laser, and a plurality of nonlinear optical crystals arranged in cascade and adapted to convert a fundamental wave emitted by said laser medium into ultraviolet light.

5. A laser source according to claim 1, wherein said wavelength converting optical system comprises a monolithic resonator constituted by one or a plurality of nonlinear crystals arranged in cascade.

6. A laser source according to claim 1, wherein each of said laser elements comprises:
   a semiconductor laser;
   a laser resonator including a laser medium, which is pumped by the light emitted from said semiconductor laser, and a nonlinear optical crystal for wavelength-converting light pumped by said laser medium; and
   a resonator including a nonlinear optical crystal for further wavelength-converting the light wavelength-converted by said laser resonator to generate ultraviolet light.

7. A laser source according to claim 1, wherein each of said laser elements comprises:
   a semiconductor laser;
   a laser resonator including a laser medium, which is pumped by the light emitted from said semiconductor laser; and
   a plurality of nonlinear optical crystals arranged in cascade and adapted to convert a fundamental wave emitted from said laser resonator into ultraviolet light.

8. A laser source according to claim 1, wherein said laser beam emitting section is a pulse laser for emitting pulse light.

9. A laser source according to claim 4, wherein said laser elements, excluding said semiconductor lasers, are bundled parallel to each other to form an ultraviolet light exit end face, and
   each of said laser elements further comprises an optical fiber for guiding the light emitted from said semiconductor laser to said laser resonator.

10. A laser source according to claim 1, wherein said plurality of laser elements are arranged parallel to each other such that ultraviolet light exit end faces of said laser elements form a matrix.

11. A laser source according to claim 1, wherein the difference between the wavelengths of the light emitted from each of said laser elements is less than 1 pm.

12. A laser source according to claim 1, wherein frequencies of the light emitted from said laser elements are different from each other.

13. A laser source comprising:
   a laser beam emitting section constituted by a plurality of laser elements for emitting pulse-like laser beams, said laser elements being arranged parallel to each other; and a timing adjusting section for controlling emission timings of said plurality of laser elements such that a plurality of laser pulse beams are not output simultaneously, each of said laser elements comprising:
a light emitter for emitting light in a wavelength range including infrared to visible regions, and a wavelength converting optical system for wavelength-converting a laser pulse beam emitted from said light emitter into ultraviolet light with nonlinear optical crystals.

14. A laser source according to claim 13, wherein each of said laser elements emits a laser pulse beam in accordance with an input trigger signal, and
said timing adjusting section generates the trigger signal, sequentially selects one of said plurality of laser elements, and outputs the generated trigger signal to the selected laser element upon each selection processing.

15. A laser source according to claim 14, wherein said plurality of laser elements have laser pulse beam exit end faces arranged in the form of a matrix to constitute said laser beam emitting section, and
said timing adjusting section sequentially selects laser elements that are spatially adjacent to each other in performing selection processing of said laser elements.

16. A laser source according to claim 14, wherein said plurality of laser elements have laser pulse beam exit end faces arranged in the form of a matrix to constitute said laser beam emitting section, and
said timing adjusting section randomly selects said laser element.

17. A laser source according to claim 14, wherein said timing adjusting section outputs a plurality of trigger signals to said plurality of laser elements at intervals set to prevent two successively emitted laser pulse beams from overlapping.

18. A laser source according to claim 14, wherein said timing adjusting section outputs a plurality of trigger signals to said plurality of laser elements at intervals obtained by dividing a pulse emission interval of each of said laser elements by the number of said laser elements.

19. A laser source according to claim 13, further comprising a second laser emitting section for emitting seed light to be supplied to each of said plurality of laser elements to perform injection seed, and
wherein said light-emitter of each of said laser elements is seeded by the supplied seed light and has an oscillation wavelength equal to an oscillation wavelength of said second laser emitting section.

20. An emission timing control method comprising the steps of:
providing a laser source having a plurality of laser elements for emitting pulse-like laser beams, each of said laser elements comprising:
a light emitter for emitting light in a wavelength range including infrared to visible regions, and
a wavelength converting optical system for wavelength-converting a laser pulse beam emitted from said light emitter into ultraviolet light with nonlinear optical crystals; and
controlling emission timings of said laser elements to sequentially cause said laser elements to emit laser pulse beams and to prevent the output laser pulse beams from overlapping each other.

21. A laser source comprising:
a plurality of laser elements arranged parallel to each other, each of said laser elements emitting a laser beam; and
an optical member having portions respectively inserted in optical paths of said plurality of laser elements and serving as optical elements for transmitting only light-components passing the optical paths and having wavelengths within a specific wavelength range, the portions being integrally supported.

22. A laser source according to claim 21, wherein said optical member is a single etalon inserted in the optical paths of said laser elements at positions corresponding to each other to have the same inclination corresponding to a desired wavelength of transmitted light with respect to all the optical paths.

23. A laser source according to claim 22, wherein each of said plurality of laser elements comprises a laser resonator, and
said etalon is inserted in optical paths inside said laser resonators.

24. A laser source according to claim 22, wherein each of said plurality of laser elements comprises a laser resonator, and
said etalon is inserted in optical paths outside said laser resonators.

25. A laser source according to claim 22, wherein each of said plurality of laser elements comprises a fundamental wave emitting section for emitting a fundamental wave and a wavelength converting section for wavelength-converting the fundamental wave, and
said etalon is inserted between said fundamental wave emitting section and said wavelength converting section.

26. A laser source according to claim 23, wherein each of said plurality of laser elements comprises a wavelength controller for controlling a wavelength of a laser beam emitted from said laser element by adjusting an equivalent length of said laser resonator in accordance with an intensity of the laser beam having passed through the inserted etalon.

27. A laser source according to claim 24, wherein each of said plurality of laser elements comprises a wavelength controller for controlling a wavelength of a laser beam emitted from said laser element by adjusting an equivalent length of said laser resonator in accordance with an intensity of the laser beam having passed through the inserted etalon.

28. A laser source comprising:
a plurality of laser elements arranged parallel to each other, each of said laser elements including a laser beam emitting section having a laser resonator and adapted to emit a laser beam in a wavelength range including infrared to visible regions, and a wavelength converting optical system for wavelength-converting the emitted laser beam into ultraviolet light by using nonlinear optical crystals; and
a single etalon inserted in optical paths of said laser resonators of all said laser elements, each of said plurality of laser elements emitting at least a laser beam having a wavelength included in a transmission wavelength range of the inserted etalon.

29. A laser source comprising:
a plurality of laser elements arranged parallel to each other, each of said laser elements including a pulse laser beam emitting section having a laser resonator and adapted to emit a pulse laser beam in a wavelength range including infrared to visible regions, and a wavelength converting optical system for wavelength-converting the emitted pulse laser beam into ultraviolet light by using nonlinear optical crystals;
a single etalon inserted in optical paths located outside exit ports of said laser resonators of all said laser elements; and a wavelength controller for controlling a wavelength of a laser beam emerging from said laser resonator by controlling a length of said laser resonator in accordance with an intensity of the laser beam transmitted through said etalon.

30. A laser source comprising:
a plurality of laser elements, each of said laser elements including a laser beam emitting section for emitting a fundamental wave as light in a predetermined wavelength region and nonlinear optical crystals arranged along an emission direction of the fundamental wave emitted from said laser beam emitting section for outputting light having a desired wavelength from the fundamental wave; and
an optical element disposed on an exit end of said laser element for diverging light from said laser element.

31. A laser source according to claim 30, wherein said optical element forms light from each of said laser elements into a point light laser at a position closer to an illumination surface than an exit end of each of said laser elements.

32. A laser source according to claim 31, wherein said optical element is a convex lens.

33. A laser source according to claim 30, wherein said optical element forms a virtual point light laser at a position closer to said laser beam emitting section than an exit end of each of said laser elements.

34. A laser source according to claim 33, wherein said optical element is a concave lens.

35. A laser source according to claim 30, wherein said optical element has many corrugations and diffuses light from each of said laser elements.

36. A laser source comprising:
a plurality of laser elements arranged parallel to each other, each of said laser elements including two mirrors made of thin films formed on transparent substrates, a laser medium and nonlinear optical crystals disposed between said two mirrors, said laser medium being adapted to generate a fundamental wave as light in a predetermined wavelength region, and said nonlinear optical crystals being adapted to generate light having a desired wavelength from the fundamental wave, and pumping laser for supplying pumping light to said laser medium; and
an optical element for forming a point light laser, said optical element being formed on the transparent substrate, of said mirrors of each of said laser elements, which is located on a laser beam exit end side.

37. A laser source according to claim 36, wherein the transparent substrate of said mirror located on the laser beam exit end side has a shape for focusing light emitted from said laser element onto a point, the shape being formed on at least a surface opposite to a surface on which the thin film is formed.

38. A laser source according to claim 36, wherein the transparent substrate of said mirror located on the laser beam exit end side has a surface in the form of a convex lens formed on at least a surface opposite to a surface on which the thin film is formed.

39. A laser source according to claim 36, wherein the transparent substrate of said mirror located on the laser beam exit end side has a shape for forming a virtual point light laser at a position closer to said laser beam emitting section than the exit end of said laser element and causing the light to diverge to irradiate the light on an illumination surface, the shape being formed on at least a surface opposite to a surface on which the thin film is formed.

40. A laser source according to claim 36, wherein the transparent substrate of said mirror located on the laser beam exit end side has a surface in the form of a concave lens formed on at least a surface opposite to a surface on which the thin film is formed.

41. A laser source according to claim 36, wherein the transparent substrate of said mirror located on the laser beam exit end side has a plurality of corrugations and causes light from each of said laser element to diverge.

42. A laser source according to claim 36, further comprising a modulator between said two mirrors to generate pulse light.

43. A laser source comprising:
a plurality of laser elements, each of said laser elements including a laser beam emitting section for emitting light of a fundamental wave having a predetermined wavelength and nonlinear optical crystals for generating light having a desired wavelength from the fundamental wave, said non-linear optical crystals being arranged along an emission direction of the fundamental wave emitted from said laser beam emitting section,
wherein said nonlinear optical crystals have a curved surface for forming a point light laser, the curved surface being formed on at least one of light incident and exit ends of said nonlinear optical crystal.

44. A laser source according to claim 43, wherein said laser beam emitting section comprises a solid-state laser pumped by light emitted from said semiconductor laser.

45. A laser source according to claim 44, wherein said nonlinear optical crystals comprise a plurality of nonlinear optical crystals arranged in cascade with respect to a radiating direction of light emitted from said solid-state laser and adapted to generate a harmonic from the fundamental wave emitted from said solid-state laser.

46. A laser source comprising:
a bundle of a plurality of laser elements arranged parallel to each other, each of said laser element including a laser beam emitting section for emitting a fundamental wave having a predetermined wavelength, and nonlinear optical crystals for generating light having a desired wavelength from the fundamental wave,
wherein said nonlinear optical crystal arranged nearest to the exit end has many corrugations formed on a light exit end of said crystal.

47. A laser source according to claim 43, further comprising a modulator in said laser beam generating section to generate pulse light.

48. A laser source according to claim 30, further comprising a condenser optical system for superimposing and focusing light beams diverging from a plurality of formed light point lasers.

49. An exposure apparatus for illuminating an illumination area on a mask and transferring a pattern formed on the mask onto a photosensitive substrate, comprising:
an ultraviolet laser having a bundle of a plurality of laser elements arranged parallel to each other;
an illumination optical system for illuminating the illumination area with the light beams from said laser source;
a mask stage on which the mask is placed;
a substrate stage on which the substrate is placed; and
a projection optical system for making a position on the mask placed on said mask stage conjugate to a position on the substrate placed on said substrate stage,
wherein each of said laser elements comprises:
a laser beam emitting section for emitting light in a wavelength range including infrared to visible regions; and a wavelength converting optical system for wavelength-converting the emitted light into ultraviolet light by using nonlinear optical crystals, and wherein wavelengths of the light emitted from said laser elements are different from each other.

50. A laser source according to claim 1, wherein said laser elements are bundled and arranged parallel to each other.

51. A laser source according to claim 13, wherein said light emitter comprises a solid-state laser.

52. An exposure apparatus comprising an illuminating light source comprised of an ultraviolet laser according to claim 1.

53. An exposure apparatus for illuminating an illumination area on a mask and transferring a pattern formed on the mask onto a photosensitive substrate, comprising:

an ultraviolet laser having a bundle of a plurality of laser elements;

an illumination optical system for illuminating the illumination area with the light beams from the laser;

a mask stage on which the mask is placed;

a substrate stage on which the substrate is placed; and a projection optical system for making a position on the mask placed on the mask stage conjugate to a position on the substrate placed on the substrate stage, wherein each of the laser elements comprises:

a laser beam emitting section for emitting light in a wavelength range including infrared to visible regions; and a wavelength converting optical system for wavelength-converting the emitted light into ultraviolet light.

54. A laser source comprising:

a plurality of discrete laser elements each including:

a laser beam emitting part for emitting light in a wavelength range including infrared to visible regions; and a wavelength converting optical system for wavelength-converting the emitted light into ultraviolet light.

* * * * *